Aug. 28, 1956 C. J. SCHILLING 2,760,351
FRACTIONATING APPARATUS
Filed Dec. 12, 1952 10 Sheets-Sheet 5
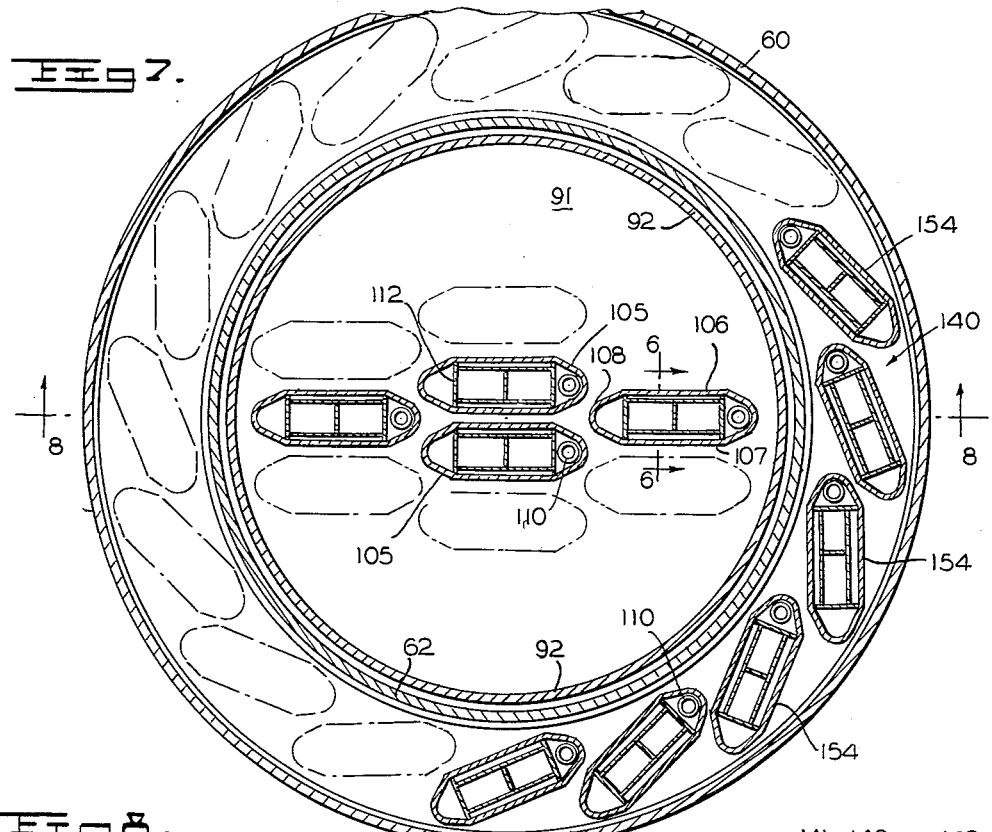
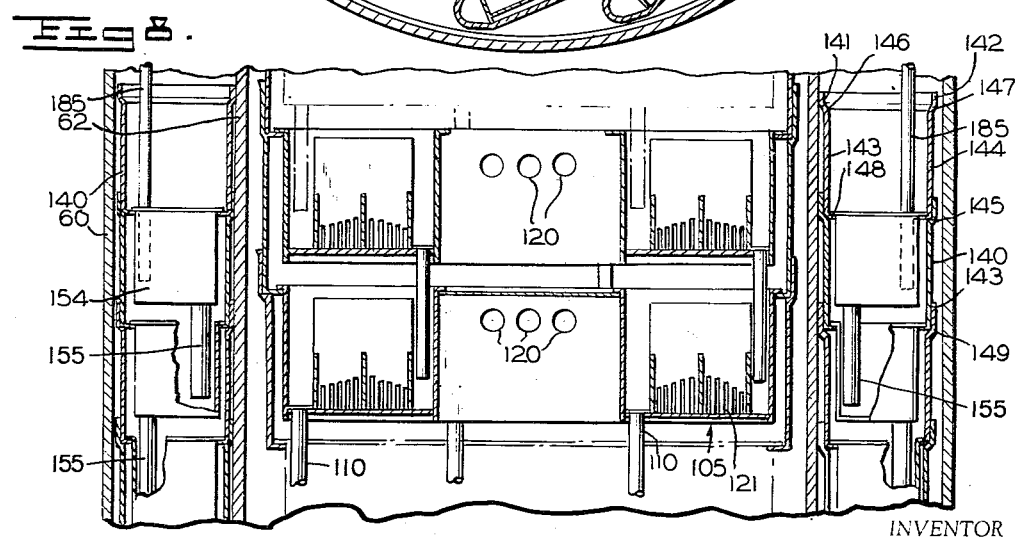
INVENTOR
CLARENCE J. SCHILLING
BY
ATTORNEY

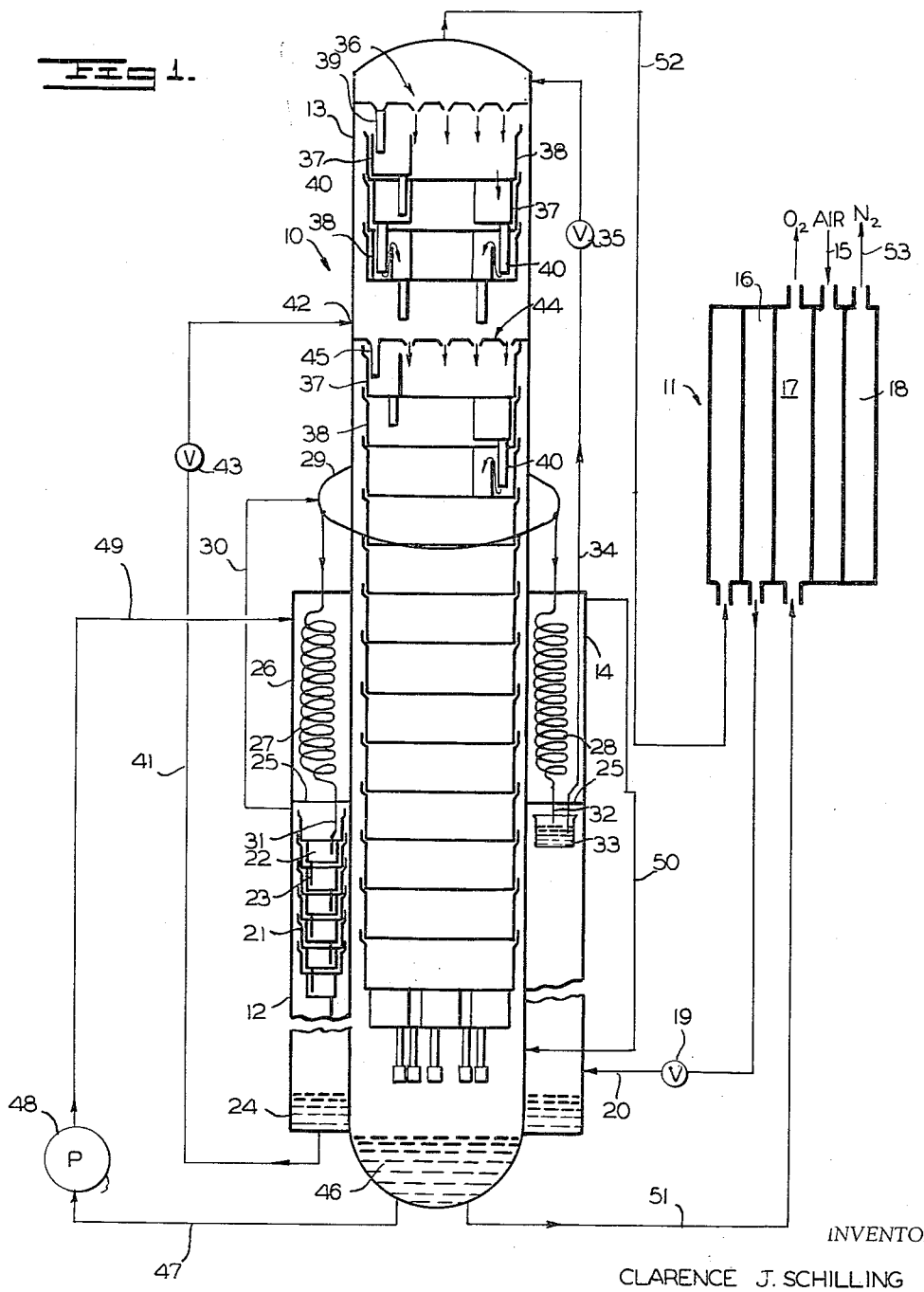

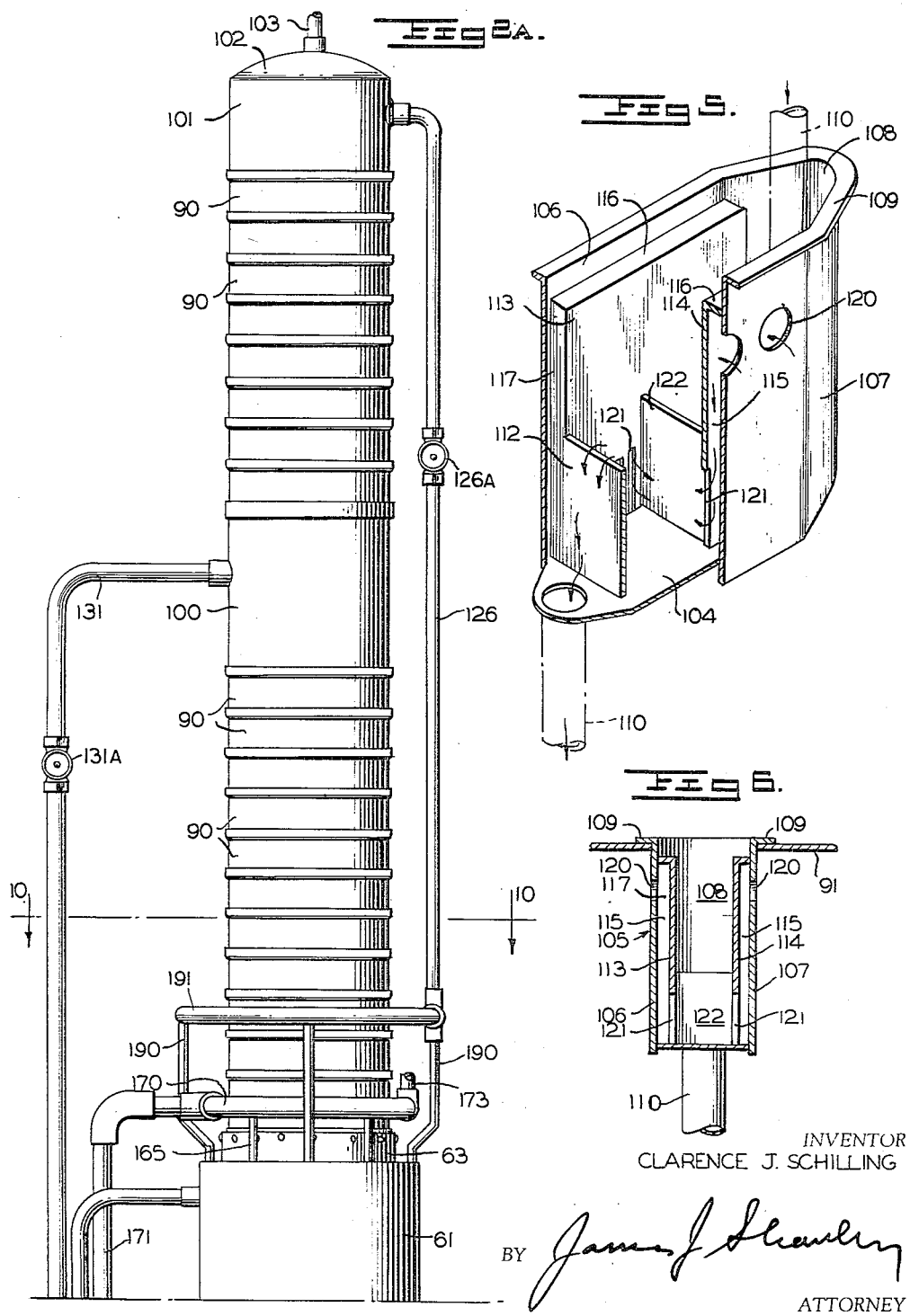

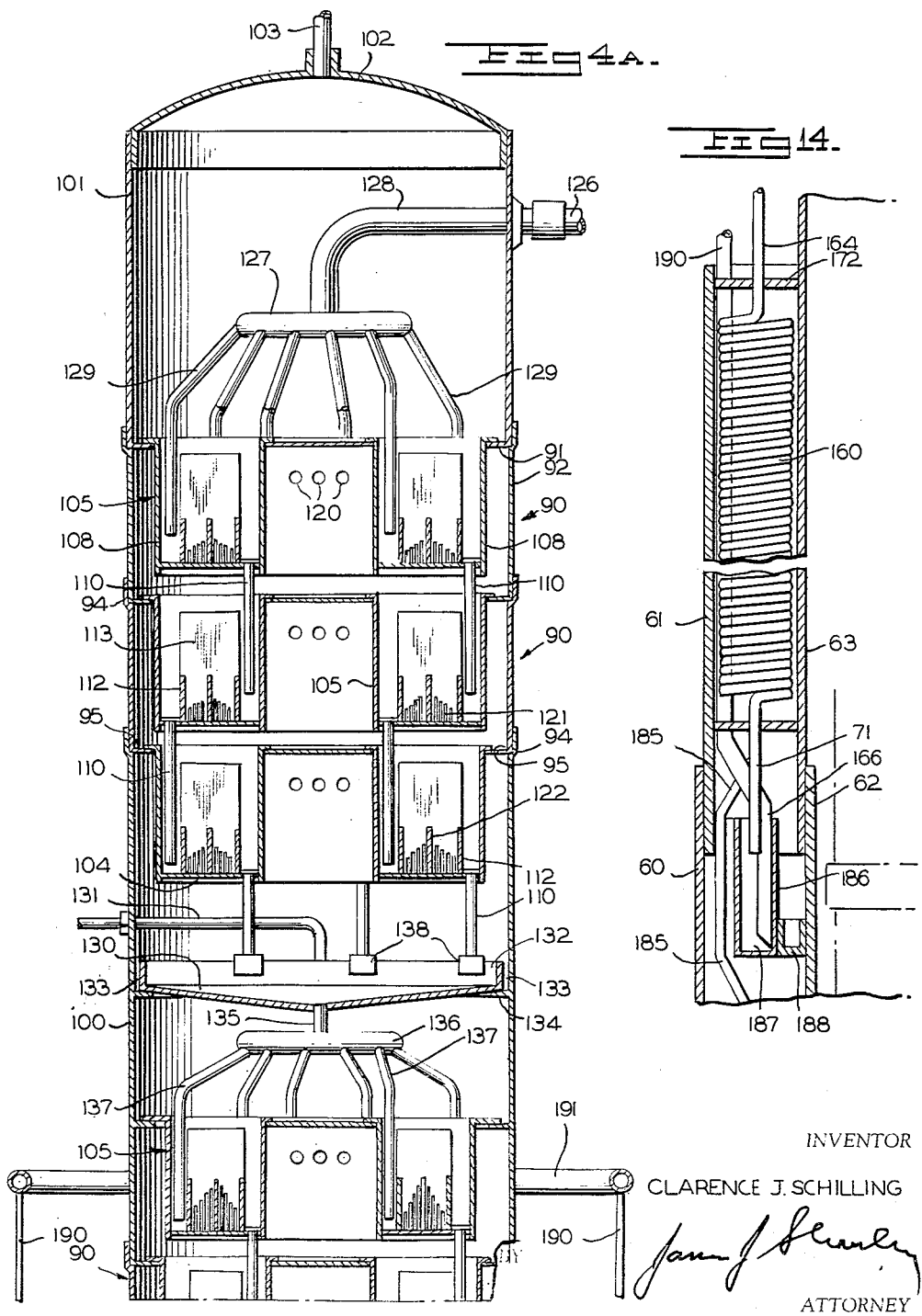

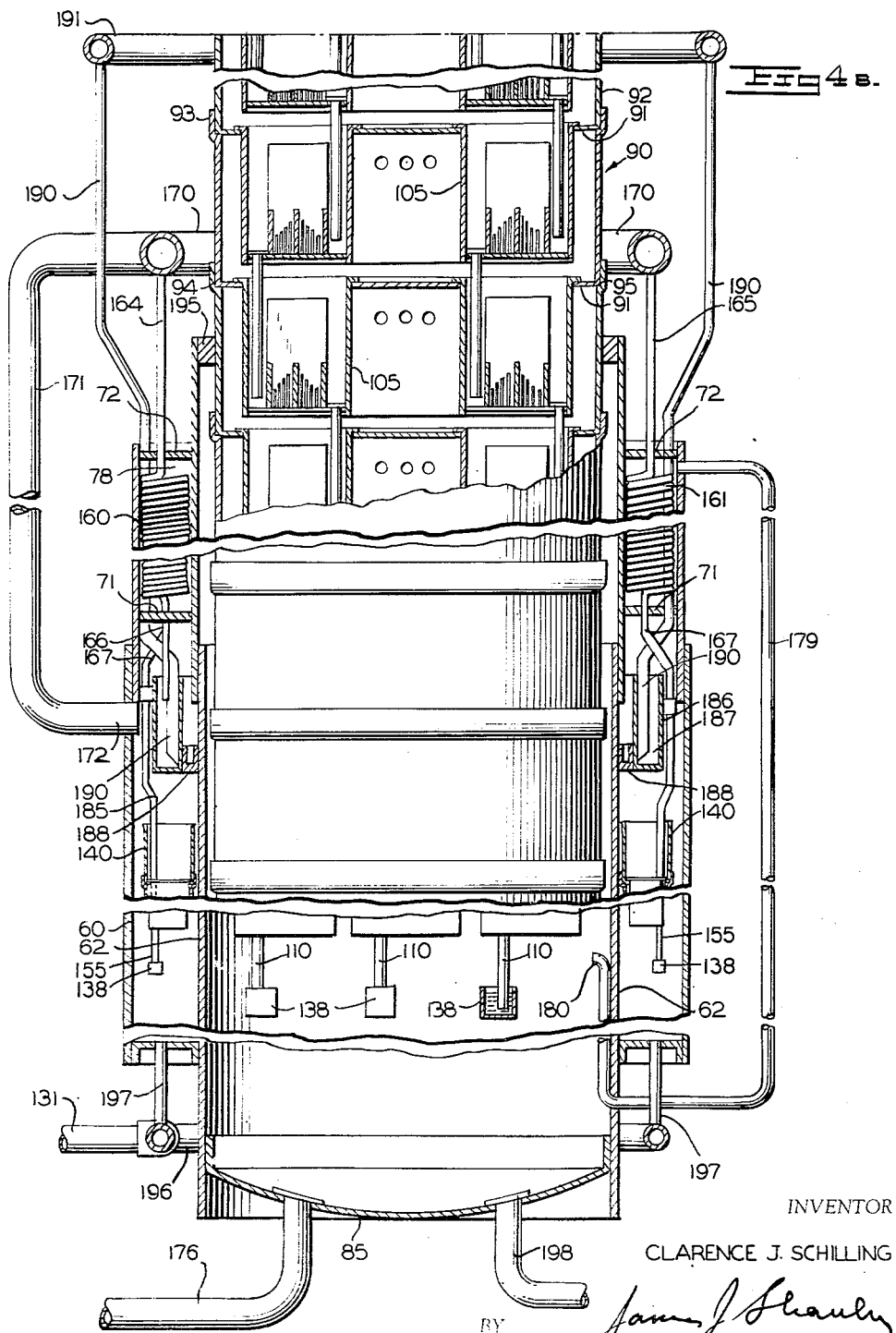

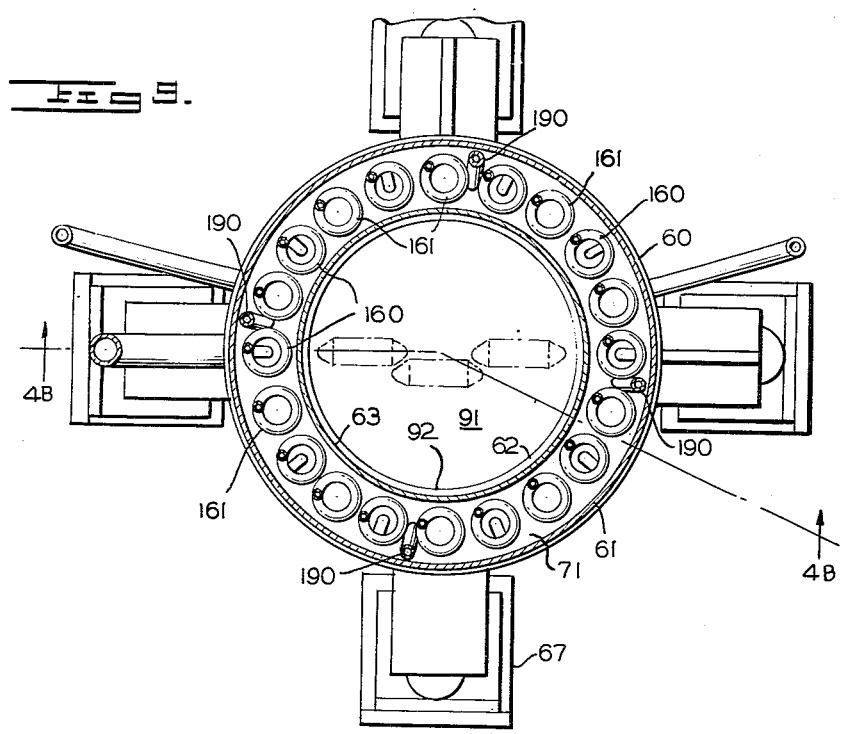
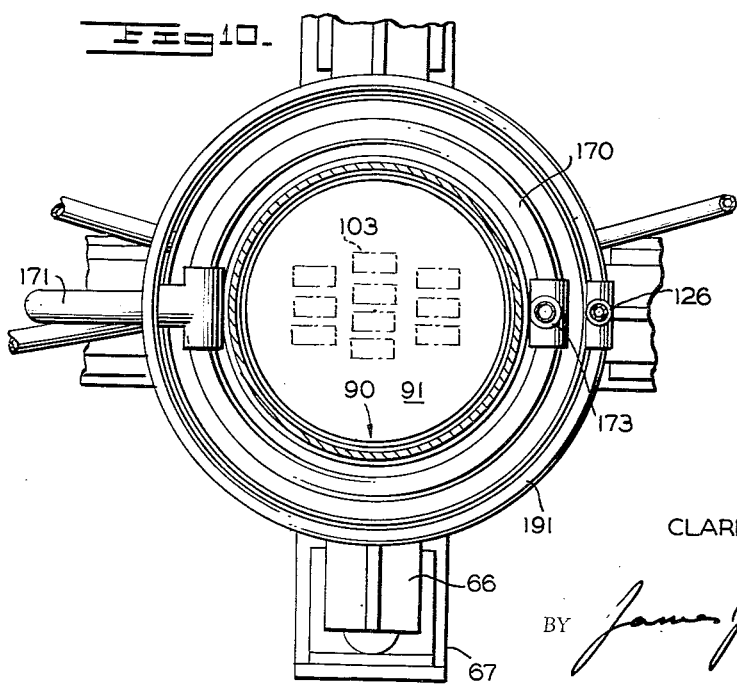

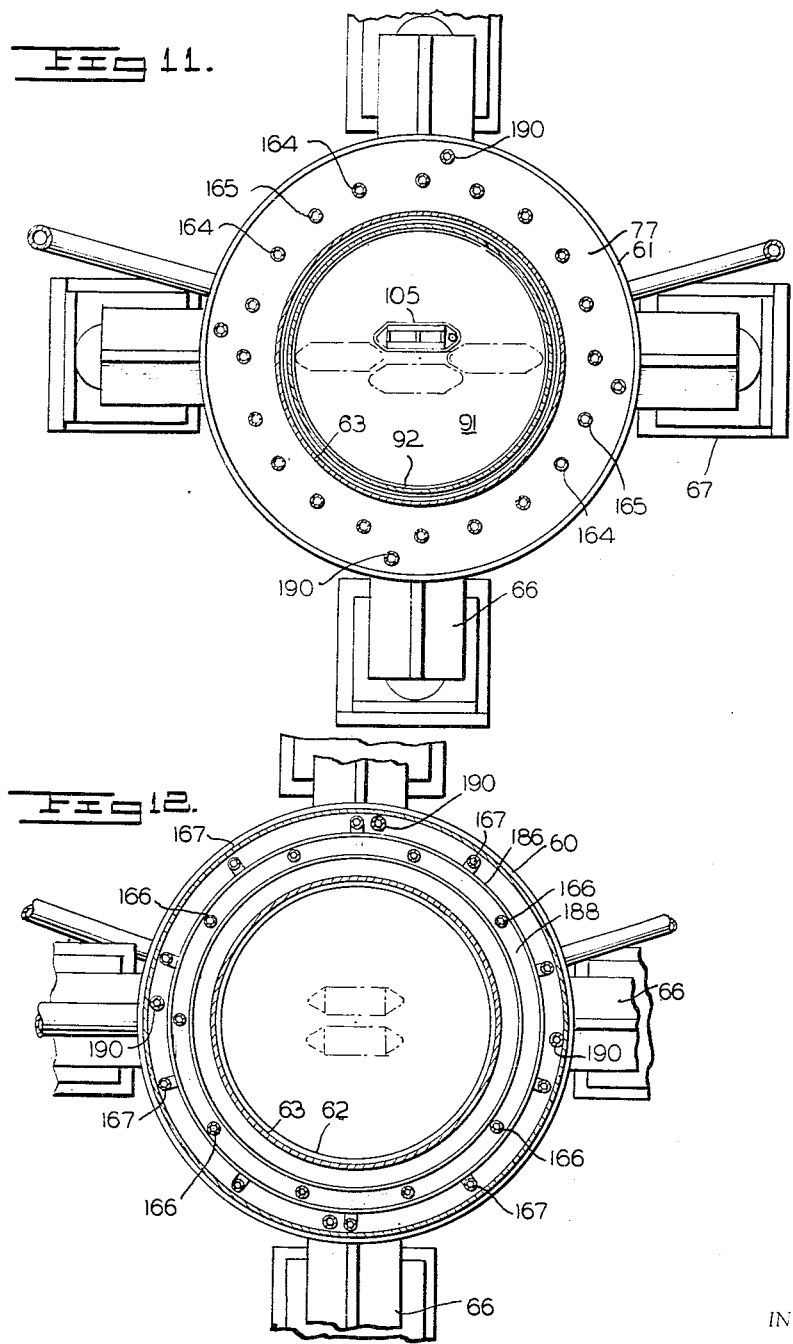

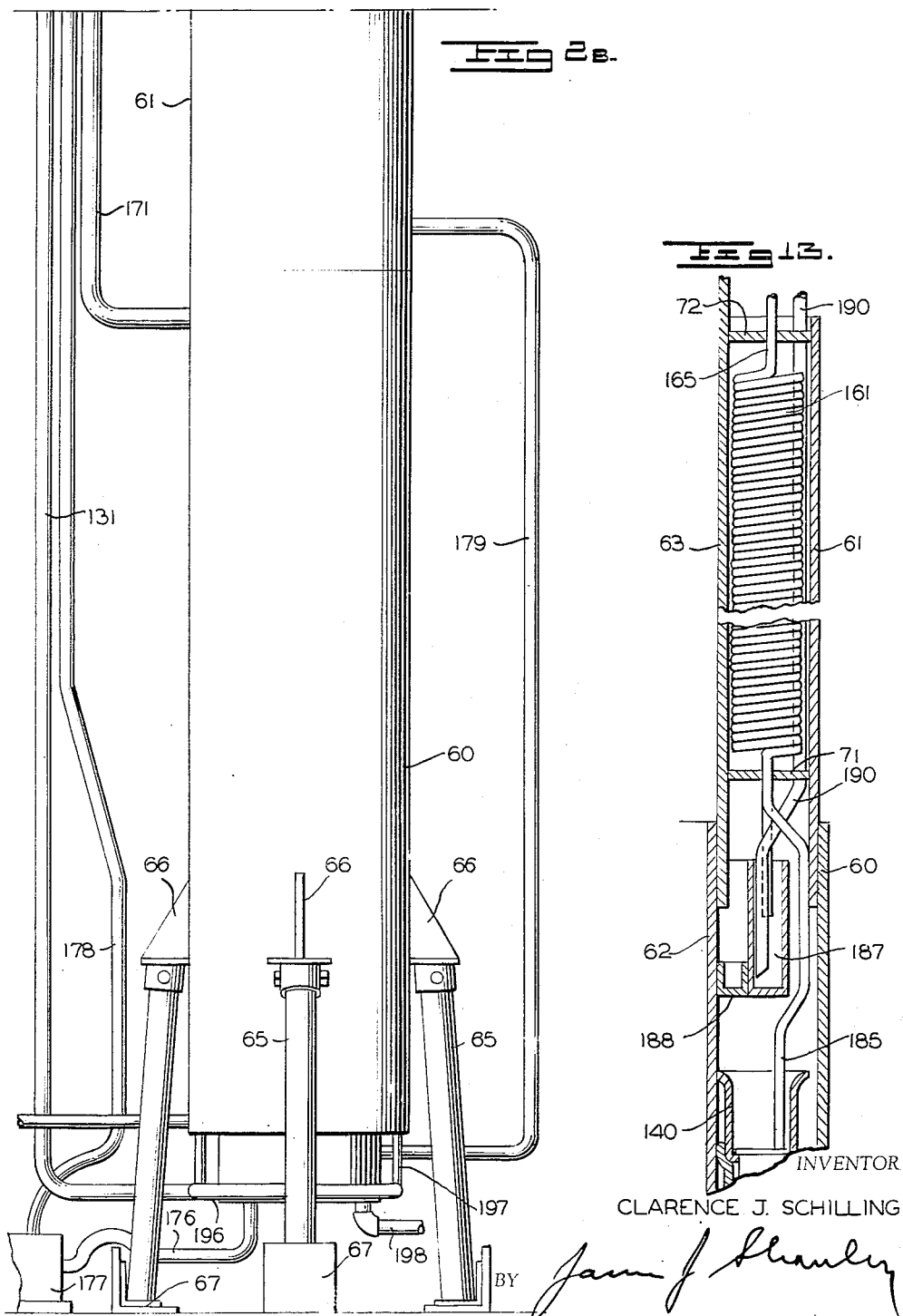

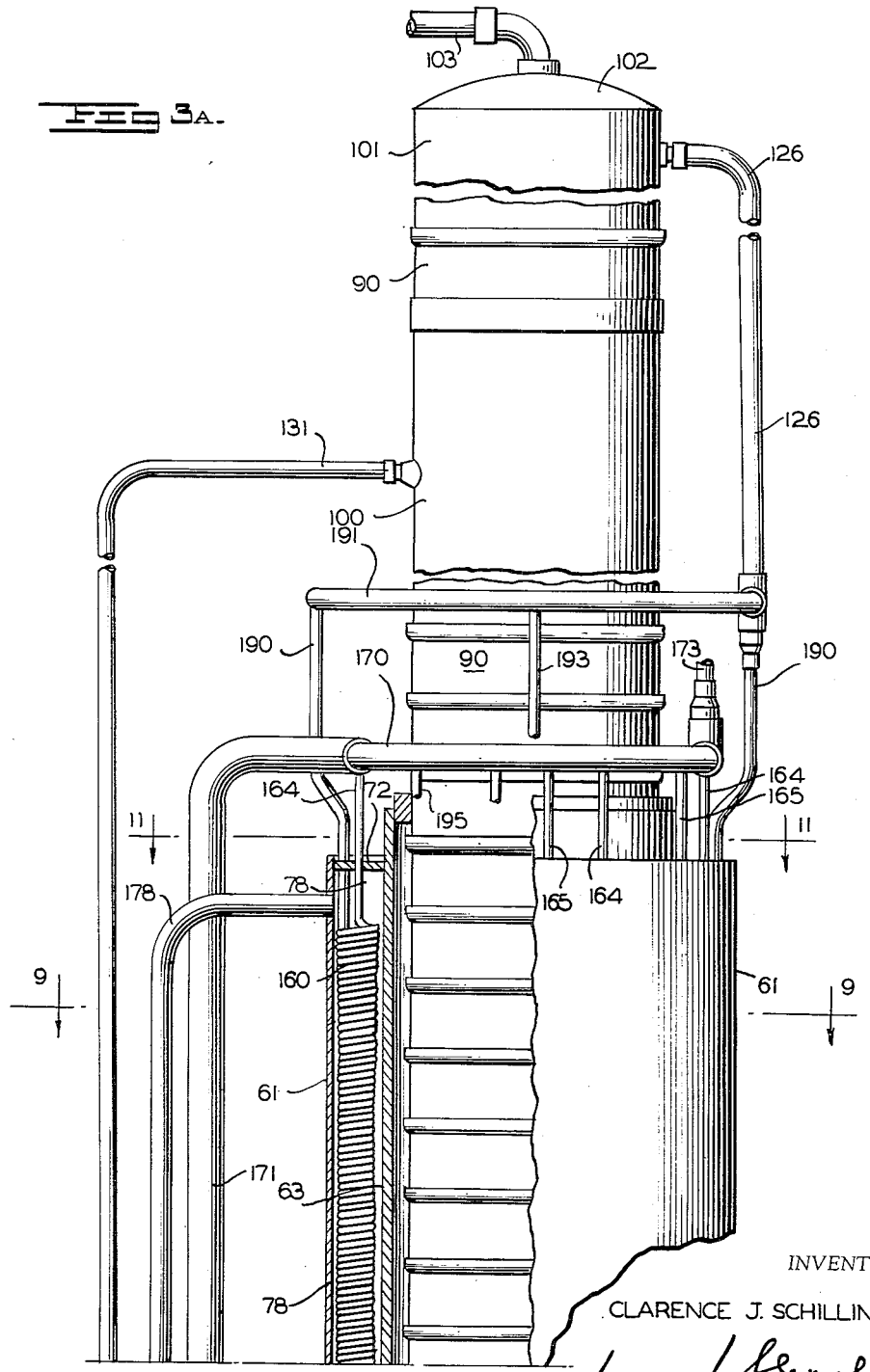

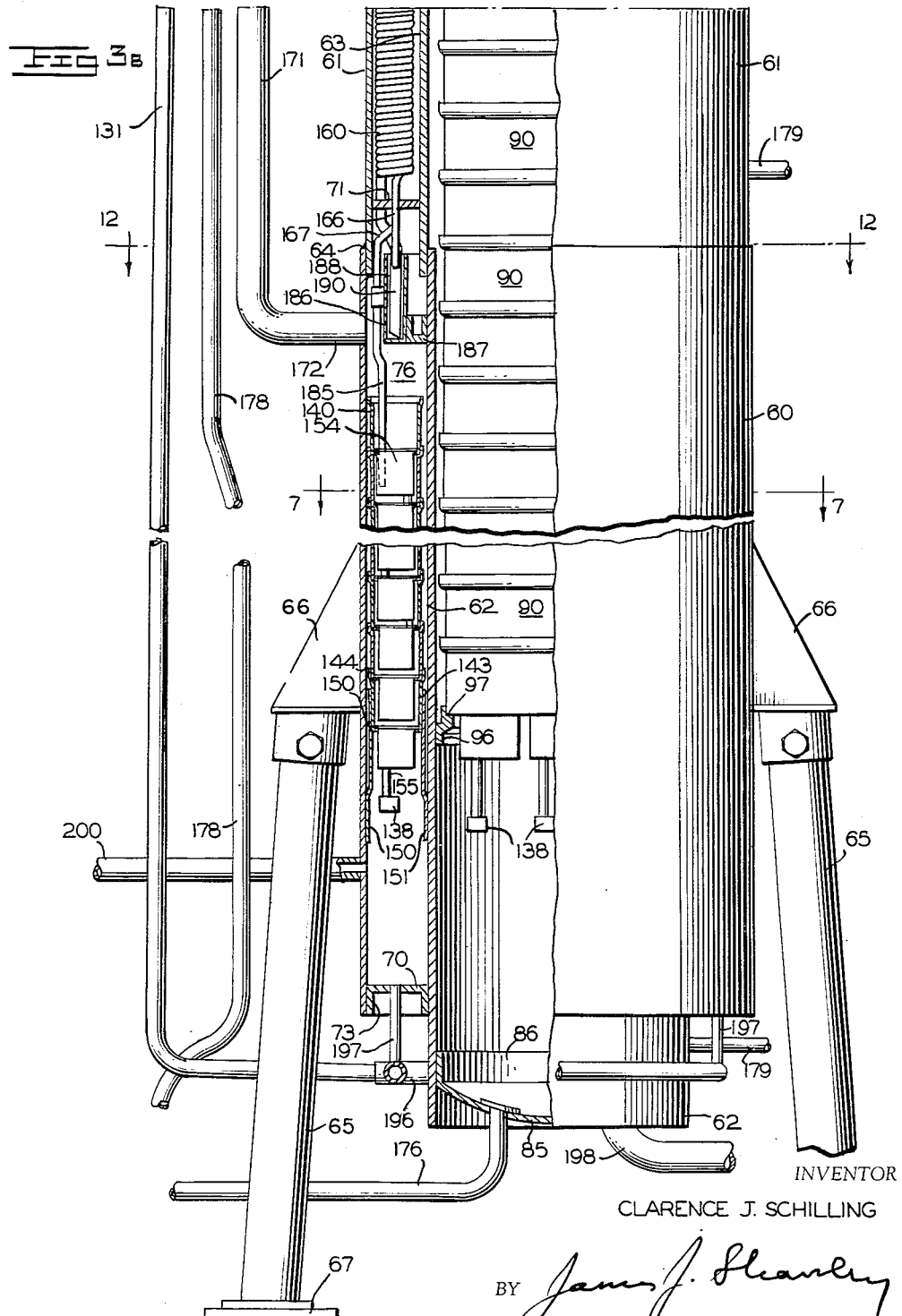

United States Patent Office 2,760,351
Patented Aug. 28, 1956

2,760,351

FRACTIONATING APPARATUS

Clarence J. Schilling, Allentown, Pa., assignor to Air Products Incorporated, a corporation of Michigan Application December 12, 1952, Serial No. 325,560

43 Claims. (Cl. 62—122)

This invention relates to improvements in apparatus for rectification, fractionation or distillation.

While the apparatus of the present invention is especially suitable for use in the separation of oxygen from the atmosphere and is described in this environment, it may be utilized in connection with substantially all operations where gas-liquid contact takes place.

In the low temperature fractionation of air as customarily practiced, the air is prepared for separation by compressing it to a relatively high pressure, and then cooling it to a very low temperature, approaching liquefaction, by heat exchange with cold products of the separation. The moisture and carbon dioxide in the air are removed either by chemical absorption prior to the cooling or by solidification and re-evaporation during the cooling in reversing counter flow heat exchanges. The thus cooled and partially liquefied air is expanded to a lower pressure and is passed into a rectifying column which may consist of one or two stages of rectification. A cold gaseous nitrogen product is withdrawn from the upper portion of the rectifying column and is passed through a counter-current heat interchanger to cool the incoming air. The oxygen product of rectification which is at a relatively low pressure may be removed as a gas or a liquid product, and to recover the refrigeration therefrom the oxygen product is also passed through a counter-current heat interchanger to cool the incoming air. A separate heat interchanger may be provided for the oxygen product and for the nitrogen product or a single multi-passageway interchanger may be provided for both the oxygen and the nitrogen products. The oxygen product may be collected as a gas at atmospheric temperature and pressure as it passes from the heat interchanger, or the oxygen product may be pumped in the liquid state to a relatively high pressure prior to passing through the heat interchanger, and then may be collected as a gas at a high pressure after the heat interchange step.

The present invention relates to fractionating column structure especially suitable for the operation described above, and more particularly to two-stage fractionating column structure of compact construction especially designed for mobile installations, where height of the apparatus is a critical factor, including an arrangement for maintaining high fractionating efficiency when the apparatus is severely deviated from a true vertical position which continuously occurs when the apparatus is mounted aboard ship, for example.

Two-stage fractionating columns producing commercially pure oxygen include a high pressure stage or zone for fractionating compressed and refrigerated air into a high pressure gaseous nitrogen fraction and a high pressure liquid fraction rich in oxygen, and a low pressure stage or zone for completing the fractionating process and producing gaseous nitrogen and commercially pure liquid oxygen. These zones are embodied in two gas-liquid contact sections of a column. The low pressure section is normally positioned on top of the high pressure section and the sections are structurally united at a downwardly draining condenser which continuously maintains the liquid oxygen product of the low pressure section in heat interchange with the high pressure gaseous nitrogen fraction collecting in the top of the high pressure section as required for two-stage operation. In as much as the two sections are positioned one on top of the other, the overall structure necessarily possesses considerable height and is not adapted for employment in mobile units or in other installations where height is a limiting factor. It has been proposed to utilize separate structures for the high and low pressure fractionating sections and to mount such separate structures independently of each other on a common platform to thus reduce the overall height of a two-stage fractionating column. While this construction achieves a substantial reduction in height of the complete apparatus, it inherently possesses certain disadvantages and does not lend itself to a solution of the overall problem. For example, the arrangement materially increasing the square footage required for the installation and in general constitutes a bulky structure.

In the conventional rectification column as employed in the separation of the constituents of gaseous mixtures following liquefaction thereof, a plurality of trays are arranged in the column, each provided with a plurality of vapor risers and bubble caps and with downcomers disposed to establish the liquid level on the trays and to conduct the flow of liquid downwardly from tray to tray throughout the column. The vapor traveling through the risers and under the bubble caps bubbles through the liquid on the trays with the result that the vapor becomes richer in the lower boiling fraction as it rises in the column, while the liquid flowing downwardly in the column becomes richer in the higher boiling portion as it flows from tray to tray.

In the operation of columns of this conventional form, the reflux liquid must flow equally across the plates for uniform upward flow of vapor through all the bubble caps. Thus, this type of construction is not operable when employed in fractionating apparatus subject to material deviations from a position in which the trays lie in a horizontal plane. This is so since the liquid on the trays would seek the lowest level of the trays and the vapor would flow freely upwardly in the columns without liquid contact through the bubble caps located at the higher side of the trays. The fractionating apparatuses disclosed in copending application Serial No. 619,110, field September 28, 1945, now Patent No. 2,720,389, for Fractionating Columns and in copending application Serial No. 315,955, filed October 21, 1952 for Gas-Liquid Contact Apparatus overcome this difficulty and provide arrangements for maintaining high fractionating efficiency even when the column is subject to severe deviatons such as would occur should the column be mounted aboard ship. In these copending applications, fractionating columns are disclosed in which the reflux liquid is divided by means of a distributor arrangement into a member of substreams, and each tray carries a number of bubbling wells equal to the number of substreams, with the wells on each tray being segregated from each other with respect to liquid while being in vapor communication. The distributor arrangement conducts the substreams to separate wells on the uppermost tray and liquid downcomers are provided for these wells for conducting the downwardly flowing liquid from each well to corresponding wells on the trays located successively below. Each well is provided with means for maintaining a pool of liquid therein through which the upwardly flowing vapor passes in liquid vapor contact. The wells are designed to maintain liquid-vapor contact without necessitating an abnormally large liquid head, even though the column may deviate up to 15° in any direction from its vertical axis.

In conventional columns much difficulty has been experienced in maintaining even flow and distribution of the reflux liquid over the trays, without which the highest efficiency can not be attained. As the diameter of the tray increases, the efficiency of the tray tends to decrease by reason of less satisfactory distribution over its area. If for any reason, as for example, buckling of the tray or settling of the column, the tray departs from a horizontal plane, its efficiency falls off very rapidly and with large diameter columns the tray becomes non-functional when the departure from horizontal is only a few degrees. Also in very large columns, the trays usually employed have an efficiency somewhat lower than those in smaller columns because of the hydraulic gradient required to cause the liquid to flow at the necessary velocity across the large dimensions involved. This results in differences in liquid depth disadvantageously greater in the upstream than in the downstream portion of the tray. These disadvantages particularly manifest in connection with large columns are overcome by practicing the invention described in the copending applications in which each tray comprises a plurality of bubbling wells through which segregated streams of the liquid reflux pass as the liquid flows downwardly in the column.

In two-stage fractionation operations, for example, in the fractionation of air into oxygen and nitrogen, heat interchange is maintained between the liquid oxygen product collecting in the base of the low pressure section and the high pressure gaseous nitrogen fraction which rises to the top of the high pressure section. This heat interchange is necessary in order to liquefy high pressure gaseous fraction and provide liquid reflux for the high and low pressure sections. In conventional apparatus this heat interchange is accomplished by the refluxing or downwardly draining condenser positioned between the high and low pressure liquid-vapor contact sections. In installations including structurally independent high and low pressure sections mounted on a common platform, it is conventional practice to provide condenser means at the top of the high pressure section and to transfer liquid oxygen product from the base of the low pressure section through the condenser means in heat exchange relation with high pressure gaseous nitrogen fraction originating in the high pressure section and to return the oxygen product following the heat exchange to the low pressure section. A portion of high pressure gaseous nitrogen fraction liquefied in this manner is allowed to flow downwardly in the high pressure as reflux liquid, while the remainder is removed from the high pressure section and employed as reflux liquid for the pressure section. In fractionating apparatus of the type in which the trays consist of a plurality of segregated bubbling wells, it is necessary to divide the liquefied high pressure gaseous nitrogen fraction for distribution to the high and low pressure fractionating sections and thereafter in each of the sections to further divide the respective portions of the liquefied high pressure gaseous nitrogen fraction into the requisite number of substreams. The prior apparatus designed to accomplish this distribution function constitutes a bulky structure as compared to the remaining portion of the column.

It is therefore an object of the present invention to provide a novel fractionating apparatus designed to overcome the disadvantages outlined above.

Another object is to provide a novel two-stage fractionating apparatus.

Another object is to provide a two-stage fractionating apparatus of substantially reduced height and of compact design requiring only a slightly larger floor area than that required for the installation of conventional two-stage fractionated apparatus of equivalent capacity.

Another object is to provide a two-stage fractionating apparatus of the character described above including a novel arrangement for reducing cold losses to a minimum.

Still another object of the present invention is to provide novel, compact fractionating apparatus especially designed for mobile installations which maintains substantially full operating efficiency even when the apparatus is materially deviated from a full vertical position.

Still another object is to provide a novel distributor arrangement for use in fractionating apparatus of the type comprising trays including a plurality of bubbling wells fed by segregated liquid streams.

A still further object of the present invention is to provide a combined reflux liquid condenser and distributor arrangement for two-stage fractionating apparatus of the character described above and particularly of the type in which the low pressure section and the high pressure section may be mounted on a common platform.

Other objects and features of the present invention will appear more fully below from the following detailed description considered in connection with the accompanying drawings which disclose a single embodiment of the invention. It is expressly understood, however, that the drawings are designed for purposes of illustration only and not as a definition of the limits of the invention, reference for the latter purpose being had to the appended claims.

In the drawings, in which similar reference characters denote similar elements throughout the several views:

Fig. 1 is a diagrammatic view of a two-stage fractionating cycle constructed in accordance with the principles of the present invention;

Figs. 2A and 2B are elevational views of a fractionating column embodying the principles of the present invention, Fig. 2B being a continuation of Fig. 2A, showing the lower portion of the column;

Figs. 3A and 3B are elevational views partially in vertical section of the column shown in Figs. 2A and 2B, Fig. 3B being a continuation of Fig. 3A, showing the lower portion of the column;

Figs. 4A and 4B are elevational views in vertical section of a fractionating column embodying the principles of the present invention, Fig. 4B being a continuation of Fig. 4A, showing the lower portion of the column;

Fig. 5 is an isometric view of a bubbling well employed by the present invention;

Fig. 6 is a view in transverse section of the bubbling well illustrated in Fig. 5;

Fig. 7 is a sectional view along line 7—7 of Fig. 3B;
Fig. 8 is a sectional view along line 8—8 of Fig. 7;
Fig. 9 is a sectional view along line 9—9 of Fig. 3A;
Fig. 10 is a sectional view along line 10—10 of Fig. 2A;
Fig. 11 is a sectional view along line 11—11 of Fig. 3A;
Fig. 12 is a sectional view along line 12—12 of Fig. 3B;
Fig. 13 is an enlarged view of the condenser-distributor arrangement shown on the right-hand side of the column located in Fig. 4B; and Fig. 14 is an enlarged view of the condenser and distributor arrangement shown on the left-hand side of the column located in Fig. 4B.

Referring more particularly to Fig. 1 of the drawings, a fractionating cycle is disclosed therein including a two-stage fractionating column 10 and a heat interchanger 11. The fractionating column 10 is constructed in accordance with the principles of the present invention and includes a high pressure section 12, a low pressure section 13 and a condenser-distributor section 14. Compressed air enters the system by a conduit 15 connected to passageway 16 of the heat interchanger 11 in which the temperature of the air is reduced by heat exchange relation with oxygen and nitrogen products from the column flowing in counter-current relation through passageways 17 and 18, respectively, of the heat interchanger 11. The cool air is then expanded to a lower pressure by passing through an expansion valve 19 and is conducted to an inlet conduit 20 by which it is introduced into the base of the high pressure section at or near its liquefaction temperature. As described more fully below, the high pressure section has an annular cross-section and includes a plurality or succession of ring-like fractionating plates 21, stacked one on top of the other, which are of novel design and will be described in detail below. In general, the fractionating plates 21 contain a plurality of bubbling wells 22 for forming segregated pools of liquid. Each well is provided with a downcomer 23 for reflux liquid overflowing from its pool which conducts the reflux liquid downwardly to separate a well in the next tray below except in the case of the last tray of the succession in which case the downcomer discharges the liquid into a pool collecting in the base of the section. In this manner, the streams of refluxing liquid are maintained segregated throughout the high pressure section of the column as they flow downwardly through vertical series of wells; the streams being merged in the base of the high pressure section and forming a pool 24 of liquid high boiling fraction, such as crude oxygen. Each well is also provided with a means for permitting the vapor rising in the section to bubble through the liquid in the wells. The rising vapors are permitted to intermingle between each plate and finally collect as gaseous low boiling nitrogen fraction at the top of the high pressure section beneath the cover plate 25.

The condenser-distributor section 14 includes an elongated chamber 26 of annular cross-section mounted on top of the high pressure section 12. The chamber 26 houses a plurality of condenser coils 27 and a plurality of condenser coils 28. The upper ends of the condenser coils 27 and 28 are each connected to a common ring-like manifold 29 fed with the low boiling fraction high pressure gaseous nitrogen fraction by way of a conduit 30 leading from the top of the high pressure section 12 directly beneath the cover plate 25 and connected to the manifold 29. The condenser coils 27 and 28 are maintained in heat exchange relation with liquid oxygen product supplied to the chamber 26, in a manner described more fully below, to liquefy the high pressure gaseous nitrogen fraction in the condenser coils. The lower end of each of the condenser coils 27 is provided with a discharge conduit 31 feeding a separate well in the uppermost plate 21 of the high pressure section, while the lower ends 32 of the condenser coils 28 discharge into an annular liquid nitrogen receiving trough 33. The number of condenser coils 27 corresponds to the number of individual wells 22 in each of the plates 21, while the number of condenser coils 28 is selected so that the liquid nitrogen delivered to the trough 33 satisfies the liquid reflux requirements for the low pressure section as described more fully below. The conduits feeding the condenser coils 27 and 28 from the manifold 29 may be provided with metering orifices for equalizing the rate of flow through the condenser coils, especially the condenser coils 27, as well as for determining such rate of flow and establishing the proper proportion between the liquid nitrogen flowing into the condenser coils 27 and into the condenser coils 28.

Liquid nitrogen collecting in the annular trough 33 is introduced into the top of the low pressure section 13 as reflux liquid for that section. For this purpose a stream of liquid nitrogen is withdrawn from the liquid nitrogen in the trough 33 by a conduit 34, expanded by an expanson valve 35 to the pressure of the low pressure section and introduced into the top of the low pressure section. The introduced liquid nitrogen stream flows to a distributor 36 which functions to divide the liquid nitrogen stream into a number of equal substreams corresponding to the number of wells 37 included on each of the plates 38 of the succession of plates comprising the low pressure section. The distributor 36 is provided with a plurality of downcomers 39 for conducting the substreams to individual wells located in the uppermost plate. The wells are constructed in a manner similar to the wells in the high pressure section described above and each well is provided with a downcomer 40 for conducting overflow liquid from its liquid pool to a corresponding well in the next plate below, except the wells of the last plate of the succession whose downcomers 40 discharge into the liquid oxygen pool 46 collecting in the base of the low pressure section.

The feed for the low pressure section 13 comprises crude liquid oxygen collecting in the pool 24 in the base of the high pressure section 12. A stream of crude liquid oxygen is withdrawn from the pool 24 through a conduit 41 and is introduced into the low pressure section at an intermediate point 42 thereof. An expansion valve 43 is included in the conduit 41 to reduce the pressure of the crude oxygen stream to the pressure of low pressure section. A distributor 44 is located below the intermediate point 42 for mixing the side stream of crude oxygen feed introduced by way of the conduit 41 with the liquid reflux flowing downwardly from the plates above. The distributor 44 may be similar to the distributor 36 and is provided with downcomers 45 for conducting equal substreams to individual wells of the plate immediately below this distributor. The low pressure section below the distributor 44 includes a plurality or succession of trays or plates 38 each including a plurality of bubbling wells 37 with the wells being provided with downcomers 40 for conducting the liquid downwardly in the section in individual streams through separate series of vertically positioned wells. As the liquid flows downwardly in the section it becomes richer in oxygen in a manner well understood by those skilled in the art, and substantially pure oxygen product, in liquid phase, collects in a pool 46 located in the base of the low pressure section. Also, vapor rising in the low pressure section becomes richer in gaseous nitrogen fraction as it flows upwardly from tray to tray and collects as gaseous nitrogen product in the top of the low pressure section.

A stream of liquid oxygen is withdrawn from the pool 46 and conducted through a conduit 47 to the suction side of a pump 48. The pump 48 functions to lift the liquid oxygen to the elevation of the top portion of the chamber 26 of the condenser-distributor section 14. A conduit 49 is provided for transferring liquid oxygen from the pump 48 to within the chamber 26 at a point near its uppermost end. The liquid oxygen in the chamber 26 is in heat exchange relation with the condenser coils 27 and 28 and effects liquefaction of the high pressure gaseous nitrogen fraction in a manner discussed above. Following this heat interchange, the oxygen product is withdrawn from the chamber 26 and introduced into the low pressure section by means of a conduit 50. The conduit 50 communicates with the lower end of the low pressure section at a point near but above the level of the liquid oxygen pool 46. A stream of liquid oxygen is also withdrawn from the pool 46 by way of a conduit 51 communicating with the passageway 17 of the heat exchanger 11. The gaseous nitrogen product collecting in the top of the low pressure section 13 is removed from the section and conducted to the pass 18 of the heat exchanger 11 by means of a conduit 52. The nitrogen product leaves the heat exchanger by way of a conduit 53 at substantially atmospheric pressure and temperature.

A two-stage fractionating column embodying the principles of the present invention and designed for operation in the cycle described above is illustrated particularly in Figs. 2A, 2B, 3A, 3B, 4A and 4B of the drawings. As shown, the column includes vertically disposed lower and upper outer cylindrical casings 60 and 61, and lower and upper inner cylindrical casings 62 and 63 of relatively smaller diameter concentrically positioned within the outer cylindrical casings. The upper cylindrical casings 61 and 63 have diameters respectively corresponding to the internal and external diameters of the outer casing 60 and the inner casing 62 so that the upper casings may slide into the lower casings in overlapping relation to form a rigid joint which may be secured by circumferential welds 64 or suitable soldering to concentrically position the upper and lower casings in substantial end-to-end relation. The lower outer casing 60 constitutes a supporting member for the entire column. For this purpose the cylindrical casing 60 is fabricated from high grade metal of suitable gauge to carry the loads involved and to provide sufficient rigidity. The column may be supported on a suitable foundation or platform by means of a plurality of standards 65 having their upper ends secured to spaced points about the circumference of the cylindrical casing 60 near its lower end by means of angle brackets 66 which may be welded or otherwise secured to the casing 60. The lower end of the standards 65 may be provided with suitable base plates 67 for distributing the load to the foundation, not shown. The inner cylindrical casings 62 and 63 are supported within the outer cylindrical casings by means of a plurality of annular supports 70, 71 and 72. The annular supports have a width corresponding to the spacing between the inner and outer cylindrical casings and are provided with vertically disposed flangs 73 at their inner and outer periphery for contacting the inner wall surface of the outer cylindrical casings and the outer wall surface of the inner cylindrical casings. The vertically disposed flanges of the annular supports are welded or otherwise rigidly secured to the contacting surfaces of the casings to form a rigid structure. The annular supports 70, 71 and 72 divide the anunular space between the inner and outer cylindrical casings into a pair of annular chambers 76 and 78. As described more fully below, the chamber 76 constitutes the high pressure fractionating zone of the column and the chamber 78 houses the condenser-distributor section.

The low pressure section of the column is positioned within the inner cylindrical casings, and the lower end of the casing 62 functions as a reservoir or liquid product collecting space for the column. For this purpose, the lower end of the inner cylindrical casing 62 is provided with a cylindrical dished cover member 85 including a vertically disposed circumferential flange 86 lying in close contact with the inner wall of the casing 62 and adequately secured thereto to form a liquid-tight compartment.

The liquid vapor contact apparatus of the low pressure section of the column includes a plurality of fractionating trays or plates 90 stacked one on top of the other to form a vertical succession with the lower portion of the succession being enclosed within the inner cylindrical casings. Each of the fractionating plates or trays 90 comprises a cylindrical dish-shaped element including a flat circular bottom portion 91 and a circular upstanding side wall portion 92. The upper rim 93 of each of the circular side walls 92 is circumferentially flanged outwardly to form a circumferential internal shoulder 94. The upper rim portions 93 are flanged outwardly a distance slightly greater than the thickness of the side walls 90 to receive the bottom of a fractionating plate with the circumferential shoulder 94 supporting the bottom circumferential edge 95 of the plate. With this arrangement, each fractionating plate is supported by the next lower fractionating plate in the succession. As shown in Fig. 3B, the last fractionating plate of the succession is supported by the lower inner cylindrical casing 62. For this purpose, a circumferential flange 96 is positioned within the cylindrical casing 62 and positively secured to its internal surface in the proximity of the desired location of the last fractionating plate of the succession. The circumferential flange 96 is provided with a circumferential shoulder 97 for supporting the bottom edge of the last fractionating plate. The succession of fractionating plates or trays 90 extend upwardly beyond the upper end of the cylindrical casing 63 and support a mixing and distributing section 100. The mixing and distributing section 100 supports another succession of fractionating plates 90 which in turn supports a distributing section 101 at the top of the low pressure section. The distributor section 101 includes a domed cover member 102 which comprises the uppermost portion of the low pressure section. A conduit 103 is connected to the central portion of the cover member 102 for withdrawing gaseous nitrogen product collecting below the cover member.

Each of the fractionating plates or trays 90 are similar and include a plurality of fractionating or bubbling wells 105. As shown more clearly in Figs. 5 and 6, each of the fractionating wells 105 are of substantially rectangular shape including parallel, vertically disposed side walls 106 and 107, rounded end portions 108 and bottom portion 104. The upper edges of the sides 106 and 107 and of the end portion 108 are provided with a continuous outwardly extending flange 109. With this construction the bottom portion 91 of the fractionating plates may be provided with a number of openings equal to the number of fractionating wells desired and of the proper size and shape to receive the fractionating wells so that the wells may be inserted into such openings and supported on the bottom portion 91 by means of the flanges 109. The joints between the flanges 109 and the bottom portion 91 of the trays are soldered to make a rigid assembly and also to provide a vapor-tight seal between these elements. One rounded end portion of each of the fractionating wells 105 receives a downcomer 110 from the fractionating well in the next plate above, or from a distributor, while the other rounded end portion supports a downcomer 110 for conducting overflow liquid to a fractionating well in the next tray below. Vertical dams 112 are positioned adjacent each of the rounded end portions transversely of the wells to provide a vapor seal for the feeding downcomer and to establish the height of the liquid pool maintained in the well. Each well also includes a pair of vertical partitions 113 and 114 located adjacent the side walls 106 and 107, respectviely, in parallel relation therewith and extending longitudinally of the well between the vertical dams 112, 112. The space 115 between the side walls and respective vertical partitions is closed at the top of the well by horizontal closure plates 116 joined to the side walls and to the top edges of the vertical partitions. The ends of the spaces are closed by vertical closure plates 117 joined to the partitions 113 and 114 through their vertical edges and extending outwardly and joined to the inner surfaces of the side walls. A series of openings 120 are provided in the side walls 106 and 107 near the tray bottom portion 91 for communication into the chambers 115 of vapor flowing upwardly in the column, and a plurality of vertically disposed slots 121 are provided in the vertical partitions 113 and 114 beneath the level of the liquid pool maintained between the vertical dams 112. With this arrangement the vapor flows from the chambers 115, past the slots 121 and through the liquid in the pool and upwardly into the space above the tray supporting the well. The slots 121 may comprise a series of vertically spaced slots of gradually increasing height as they approach the center of the fractionating well. This arrangement increases the maximum angle of deflection at which high fractionating efficiency is maintained. The provision of an intermediate vertical dam 122 aids in attaining this performance. Fractionating wells of the type described above are mounted in the fractionating column so that the greatest deviation of the column will cause the well to pivot about an axis passing through the intermediate dam 122. As seen more clearly in Fig. 7, the fractionating wells 105 of each of the fractionating plates or trays 90 are closely nested together and are proportioned considering the diameter of the trays to substantially completely occupy the entire area of the trays.

The number of fractionating wells on the fractionating trays determines the number of segregated substreams of reflux liquid flowing downwardly in the low pressure section of the column. Hence, the reflux liquid conducted to the top of the low pressure section of the column by way of a conduit 126, including an expansion valve 126A, is divided into a number of equal substreams corresponding to the number of wells on each tray, and each substream is conducted to an individual well in the first fractionating tray of the succession of fractionating trays. The formation of the substreams of reflux liquid and the delivery of the substreams to the individual wells is accomplished in the distributor section 101. The distributor section may include apparatus constructed in accordance with the teachings disclosed in copending applications Serial No. 109,657, filed August 11, 1949, now Patent No. 2,701,710, for Fractionating Columns, Serial No. 315,955, filed October 21, 1952 for Gas Liquid Contact, or any other suitable arrangement for performing the desired function. For example, a hollow distributor plate 127 symmetrically fed with reflux liquid by a conduit 128 may be employed. The distributor plate equally feeds a number of similar conduits 129 corresponding to the number of substreams desired and each of the conduits 129 terminates within one of the fractionating wells to conduct a substream to an individual fractionating well of the first fractionating ray.

The overflow liquid from the fractionating wells in the first tray is conducted through individual downcomers 110 to corresponding fractionating wells in the next tray below, and the overflow liquid from the wells of the second tray is conducted in segregated substreams to individual wells in the third tray and so on through the first series of fractionating trays 90 positioned above the mixing and distributing section 100. The mixing and distributing section 100 may also be constructed in accordance with the teachings of the aforementioned copending applications. Another suitable arrangement may include a conically-shaped liquid collecting plate 130 mounted in the column beneath the downcomers 110 from the wells of the fractionating tray immediately above, and also below a conduit 131 conducting the side stream of feed liquid into the column, the latter conduit including an expansion valve 131A. The collecting plate has a diameter slightly less than the internal diameter of the column and is provided with a circumferential upstanding side flange 132 to collect the downwardly flowing liquid and provide a passageway 133 for the upwardly flowing vapor. The collecting plate may be supported in the column as shown in the drawing by means of a number of brackets 134 secured to the inner wall of the section 100 and extending outwardly therefrom. The lowest point of the collecting plate 130 merges into an output conduit 135 which feeds a hollow distributor plate 136 which may be similar to the distributor plate 127 described above. The distributor plate 136 equally feeds a number of conduits 137 corresponding to the number of substreams and each of the conduits 137 terminates within an individual fractionating well on the first tray below the mixing and distributing section 100 to conduct the downwardly flowing reflux liquid in segregated substreams to individual fractionating wells. A vapor seal 138 may be postioned on the ends of the downcomers 110 feeding the collecting plate 130.

The reflux liquid flows downwardly through the succession of fractionating trays below the mixing and distributing section 100 as segregated substreams of equal volumetric relation each flowing downwardly through a series of vertically spaced fractionating wells and with the upwardly flowing vapor bubbling through the pools of liquid formed in the wells. The downcomers 110 from the fractionating wells of the last fractionating tray in the low pressure section discharge into the base of the column and liquid product collects in a pool above the end member 85. The discharge ends of these downcomers may be provided with vapor seals 138 which function to assure upward flow of vapor through the liquid retained in the individual fractionating wells.

The high pressure section of the fractionating column includes a succession of fractionating trays 140 housed within the high pressure chamber 76. The fractionating trays 140 are ring-shaped and include internal and external diameters to fit snugly about the inner cylindrical casing 62 within the cylindrical casing 60. The trays 140 are adapted to be stacked one on top of the other in a manner similar to fractionating trays 90 of the low pressure section. For this purpose, the upper ends 140 and 142 of vertical side portions 143 and 144, respectively, are flared outwardly, away from the ring-shaped bottom portion 145, throughout the circumference of the side portions to form an inner circumferential shoulder 146 and an outer circumferential shoulder 147. The upper ends 141 and 142 are flared outwardly a distance silghtly greater than the thickness of the side portions 143 and 144 so that the lower ends of the trays may extend between the flared portions of the upper ends with the inner circumferential edge 148 and the outer circumferential edge 149 and rest upon the shoulders 146 and 147, respectively. As shown in Fig. 3B, the last tray 140 of the succession of high pressure fractionating trays, and hence, all of the trays of the succession, is supported within the chamber 76 by means of a pair of circumferential brackets 150 and 151. These brackets are ring-shaped; the bracket 150 being secured to the inner surface of the cylindrical casing 60 throughout its circumference and the bracket 151 being secured to the outer surface of the cylindrical casing 62 throughout its circumference. The upper ends of the brackets 150 and 151 may be secured to the side portions 144 and 143, respectively, of the last tray of the succession, or the brackets may be provided with circumferential shoulders similar to the circumferential shoulders of the trays, for supporting the last tray.

As in the case of the low pressure section, the downwardly flowing reflux liquid in the high pressure section of the column is divided into a chamber of substreams of equal volumetric relation which pass downwardly in the section through individual wells 154 located on each of the trays. In order to reduce the cost of manufacture and simplify construction, the fractionating wells 154 may be similar to the fractionating wells 105 included in the low pressure section as shown in detail in Figs. 5 and 6. As shown more particularly in Fig. 7, the fractionating wells 154 are positioned on the trays 140 in such a manner as to provide for the largest possible number of wells on each of the trays. In the arrangement shown in the drawings in which the fractionating wells 154 are similar to the fractionating wells 105 included in the low pressure section and in which the dimension of the high pressure trays between the walls 140 and 142 as measured along a radius of the cylindrical casing 60 is less than the length of the fractionating wells, the largest number of wells on each one of the trays is obtained by positioning the wells tangentially with respect to the cylindrical casing. In particular, the center of each of the fractionating wells, that is the point of intersection of the longitudinal and transverse axes of each of the wells, lies on a mean circle of the fractionating trays equally distant from the side portions 140 and 142 and on equally spaced radii of the outer cylindrical casing 60 with the inner side walls 142 lying on or adjacent to equally spaced tangents of the inner cylindrical casing 62. This arrangement not only provides a compact assembly in which the largest number of fractionating wells may be positioned on the ring-like pressure fractionating trays but also aids in maintaining fractionating efficiency when the column deviates from a true vertical position. It is expressly understood that the present invention contemplates use of different designs of fractionating wells as set forth in the copending applications mentioned above including the use of different types of fractionating wells in the high and low pressure sections as well as fractionating wells of similar design but of different dimensions in each of the sections.

The high pressure fractionating plates are mounted one on top of the other with downcomers 155 leading from each of the fractionating wells of each plate for conducting downwardly flowing liquid from each well to a corresponding well in the next plate below. The fractionating wells in the last tray of the succession discharge liquid from their downcomers 155 into the base of the high pressure section above the closure member 70. These downcomers may be provided with vapor seals 138 for insuring upward flow of vapor through the pools of liquid in each of the wells. The liquid crude oxygen collecting in the base of the high pressure section above the plate 70 is withdrawn in a plurality of streams by conduits 197 which are merged in a ring manifold 196 surrounding the cylindrical casing 62. The manifold 196 has a connection with the conduit 131 for conducting the crude liquid oxygen into the low pressure section as feed in the manner described above.

As mentioned above, it is an object of the present invention to provide a novel condensing and distributing arrangement particularly for use with two-stage fractionating columns designed for operation as mobile units in which the column may be subjected to severe deviations of the type including an arrangement by which the reflux liquid is passed downwardly in the column as segregated substreams with each stream flowing through individual wells on each of the trays forming pools of liquid in which the liquid-vapor contact takes place. As described above, the upper outer cylindrical casing 61 and the concentrically positioned upper inner cylindrical casing 63 cooperate with the ring-like closure plates 71 and 72 to define an elongated chamber 78 of annular or ring-like configuration. The chamber 78 houses the novel combined condensing and distributing apparatus provided by the present invention.

With additional reference to Figs. 9-14, the condensing and distributing apparatus includes a plurality of condenser elements 160 and 161, each of which comprises an elongated piece of tubing formed into a helical coil, which may be tightly wound as shown, having a length less than the distance between the ring-like closure plates 71 and 72 and a diameter less than the distance between the cylindrical casings 61 and 63 measured along a radius of the cylindrical casing 61. The condenser elements are mounted in the housing 78 with the longitudinal axis of the helical coils parallel to the vertcal axis of the column. The condenser elements 160 and 161 also include inlet feed conduits 164 and 165 and discharge conduits 166 and 167, respectively. The inlet feed conduits and the discharge conduits extend in opposite directions from the opposite ends of the coils. The closure plate 71 is provided with a plurality of openings for receiving the discharge conduits 166 and 167, while the closure plate 72 is provided with a series of similar openings of equal number for receiving the inlet feed conduits 164 and 165. The openings in the closure plates for the inlet and discharge conduits may be equally spaced on a circle lying equidistant between the cylindrical casings 61 and 63. The inlet feed conduits 164 and 165 and the discharge conduits 166 and 167 are preferably brazed or soldered to their respective closure plate in order to provide a rigid assembly and a liquid and vapor tight seal between the feed and discharge conduits and the cover plates.

The upper ends of the inlet feed conduits 164 and 165 are joined to a ring-like manifold 170 which surrounds the low pressure section and lies in a plane perpendicular to the vertical axis of the column. The manifold 170 is fed from a conduit 171 which joins with a conduit 172 communicating with the high pressure zone adjacent the upper end of the chamber 76. The gaseous low boiling fraction collecting in the upper portion of the high pressure section, such as gaseous nitrogen fraction, is conducted through the conduits 172 and 171 into the manifold 170 and is equally distributed to each of the inlet feed conduits 164 and 165. The manifold 170 may be fed by means of additional conduits similar to the conduits 171 and 172 should such an arrangement be necessary to insure equal distribution of the gaseous low boiling fraction throughout the manifold. The equal flow of gas through each of the inlet feed conduits 164 and 165 is maintained since each of these conduits are of equal size and thus function as metering devices. The manifold 170 is provided with a conduit 173 for bleeding off incondensible gases.

In order to condense the gaseous lower boiling fraction delivered to the condenser elements 160 and 161 from the manifold 170, means are provided for passing a relatively colder fluid through the chamber 78 in heat exchange relation with the condenser elements. In conventional two-stage fractionating operation the liquefaction of the gaseous lower boiling fraction from the high pressure section is accomplished by heat exchange between the lower boiling fraction and liquid product collecting in the low pressure section. Due to the relative height of the liquid product collecting space in the low pressure section of the column and the condenser elements 160 and 161, means are required for lifting or pumping the liquid product collecting above the cover member 85 to the elevation of the upper portion of the condenser and distributor chamber 78. This function may be accomplished by any conventional pump adapted for pumping volatile liquids such as an arrangement disclosed in copending application Serial No. 262,235, filed December 18, 1951, now forfeited, for Liquid Transfer. As shown in the drawings, a stream of liquid product is withdrawn from the base of the low pressure section and delivered to the section side of a suitable liquid lifting device or pump 177 by means of a conduit 176. The stream of liquid product discharged from the pump is conducted by way of a conduit 178 to within the condenser and distributor chamber 78 directly below the cover member 72 and above the upper ends of the helical coils of the condenser elements 160 and 161. The liqud product flows into the chamber 78 and surrounds the condenser elements 160 and 161 and effects liquefaction of the gaseous low boiling point fraction within the helical coils. Following this heat exchange, the liquid product, which may include a partial vapor phase, is returned to within the low pressure column at a point above the level of the pool of liquid product collecting in the base of the low pressure section. A conduit 179, leading from the chamber 78 below the cover plate 72 to within the low pressure column and terminating in a discharge opening 180 above the level of the pool of liquid product collecting in the base of the low pressure column, is provided for this purpose.

The number of condenser elements 161 corresponds to the number of individual fractionating wells 154 on each of the fractionating trays 140, and each of the discharge conduits 167 is joined to a distributing conduit 185 which feeds an individual well 154 in the first fractionating tray of the high pressure section. The discharge conduits 166 from the condenser elements 160 extend downwardly below the cover member 71 and terminate in an annular liquid receiving trough 186. The annular liquid receiving trough 186 has a substantially U-shaped cross-section forming an annular chamber 187 extending around the column. The trough 186 may be rigidly supported in this position by means of a number of angular brackets 188 secured to the trough 186 and the outer surface of the cylindrical casing 62. The discharge conduits 166 extend into the annular chamber 187 and conduct liquefied low boiling fraction to the annular trough. The liquid collecting in the chamber 187 constitutes reflux liquid for the low pressure section of the column. This liquid is conducted upwardly to the reflux liquid feed conduit 126 by means of a plurality of liquid risers 190 extending from within the annular chamber 187 upwardly through the condenser and distributor chamber 78 and terminating in liquid communication with an annular collecting manifold 191 feeding the conduit 126. Preferably four quadraturally disposed liquid risers 190 may be employed in order to ensure proper supply of liquid reflux for the low pressure section irrespective of column deviation.

The proportionment of liquefied low boiling fraction from the high pressure section as reflux liquid for the high pressure section and as reflux liquid for the low pressure section is controlled by the operating characteristics of the fractionating column and is established and continuously maintained by selecting the proper size of condenser elements 160 and 161 relative to the rate of flow of liquefied low boiling fraction therethrough and the relative number of condenser elements 160 and condenser elements 161. As mentioned above, the number of condenser elements 161 correspond to the number of individual wells 154 and hence the number of substreams of liquid flowing downwardly in the high pressure section. The size of these condenser elements are selected to provide the required rate of flow of liquid for proper operation of the high pressure section of the column. The number of condenser elements 160 determines the quantity of reflux liquid available for feeding the low pressure section. For sake of clarity the condenser elements 160 and 161 are illustrated as being equal in number and alternately positioned in the angular chamber 78. It is to be expressly understood, however, that in actual practice the condenser elements 160 and 161 may differ in number, and that the number of condenser elements 160 and 161 are determined by the reflux liquid requirement for the high and low pressure sections of the column as discussed above.

In operation of the two-stage fractionating column described above, compressed and cooled mixture of component gases, such as air, is expanded and introduced into the base of the low pressure section by way of a conduit 200. Partial rectification of the air takes place in this section with crude liquid oxygen higher boiling fraction collecting in the base of the high pressure section above the plate 70 and with gaseous nitrogen lower boiling fraction collecting in the top of the section below the plate 71. The gaseous nitrogen is withdrawn from the low pressure section by way of the conduit 172 and is delivered to the ring manifold 170 through the conduit 171. From the manifold 170 the high pressure gaseous nitrogen is conducted in equal streams to the condensers 160 and 161. The gaseous nitrogen is liquefied in the condensers due to the heat exchange with the relatively colder liquid oxygen product fed to the chamber 78. The liquefied gaseous nitrogen in the condensers 160 feed individual wells in the first fractionating tray of the high pressure section while the liquefied gaseous nitrogen from the condensers 161 discharge into the liquid nitrogen receiving trough 188. Liquid overflowing from the wells of the first tray in the high pressure section is conducted downwardly in individual streams being in contact with upwardly flowing vapor streams in segregated pools so that the liquid becomes richer in oxygen and the vapor richer in nitrogen as the streams pass downwardly and upwardly in the column. The liquid nitrogen collecting in the trough 188 is delivered by means of liquid risers 190, manifold 191 and conduit 126 to the top of the low pressure section where the expanded liquid is subdivided by means of the distributor 101 into a plurality of substreams equal to the number of fractionating wells on each tray of the low pressure section. The liquid streams flow downwardly in the low pressure section through vertical series of segregated wells with the downwardly flowing liquid stream being mixed together with the side stream of expanded crude liquid oxygen feed and thereafter redistributed into segregated substreams for downward flow throughout the remaining trays of the low pressure section. A stream of liquid oxygen is withdrawn from the base of the low pressure section by means of the conduit 176 and is raised to the elevation of the chamber 78 by means of the pump 177 and the conduit 178 to effect liquefaction of the gaseous nitrogen in the condensers. The effluent oxygen product from this heat exchange is returned to the low pressure section by means of the conduit 179. Liquid oxygen product is removed from the base of the low pressure section of the column by way of the conduit 198 while the gaseous nitrogen product is removed from the top of the low pressure section by way of the conduit 103.

The concentric arrangement of the high and low pressure sections of the column materially reduces the overall height of the column and provides a more compact assembly requiring relatively smaller square footage of floor space as compared to conventional installation of separate high and low pressure sections mounted on common platforms. In addition to these advantages, the concentric relation of the high and low pressure fractionating sections reduces cold losses even when the entire column assembly of prior construction is provided with the most efficient insulation that may be practically employed. It has been determined that the temperature difference between the high pressure section and the low pressure section of the column is materially less than the temperature differences between the high and low pressure sections of conventional fractionating apparatus and the surrounding insulation. Thus, the provision of forming the high pressure section as an annular chamber surrounding a cylindrical low pressure section provides an arrangement in which cold losses are materially reduced as compared to conventional apparatus relying on insulation solely for this purpose.

As discussed above, the low pressure section comprises a succession of fractionating plates 90 stacked one on top of another with the lower portions of the succession extending within the inner cylindrical casings 61 and 63. The cylindrical fractionating trays 90 have a diameter such that a substantial space is maintained between the outer periphery of the fractionating plates and the inner surfaces of the cylindrical casings 61 and 63. A ring-like closure member 195 is positioned between the upper end of the cylindrical casing 63 and the side wall of the adjacent fractionating tray 90, while the supporting flange 96 comprises a seal between the last fractionating tray of the succession and the inner wall of the cylindrical casing 61. This construction provides an annular cavity 201 between the high and low pressure sections of the column. This cavity may be filled with air or any other inert gas and reduces any objectionable heat transfer between the column sections due to their concentric relationship.

The provision of a plurality of refluxing condensers 160 and 161 is particularly advantageous in connection with a column of the type described above including fractionating trays having a plurality of segregated wells in which individual condenser elements act as distributors feeding liquid to the wells on the first fractionating tray of the high pressure section. It is to be expressly understood, however, that the provision of plural refluxing condenser elements has advantageous utility in fractionating apparatus not including the type characterized by fractionating plates made up of a plurality of individual fractionating wells. For example, the construction of a two-stage concentric fractionating column, according to the present invention, readily adapts itself to the utilization of plural refluxing condensing elements, a portion of which may function to supply reflux liquid for the low pressure section of the column while the remaining portion may function as distributors for refluxing liquid conducted to the low pressure section.

While only one embodiment of the invention has been disclosed and described herein, it is expressly understood that various changes and substitutions may be made therein without departing from the spirit of the invention as well understood by those skilled in the art. Refer-

What is claimed is:

1. A fractionating column including a succession of fractionating trays, each tray including a plurality of fractionating wells, the wells being provided with separate downcomers for conducting liquid downwardly to individual wells in the next tray below and means for conducting upwardly flowing vapor through the liquid in the wells, and a condensing and distributing means for liquefying vapor originating in the column and for distributing the liquefied vapor to individual wells of the first tray of the succession of fractionating trays, the condensing and distributing means including a plurality of condenser elements each having an inlet opening and a discharge opening, means conducting the vapor from the column to the inlet opening of each of the condenser elements, means conducting liquid from the discharge opening of each of the condenser elements to individual wells in the first tray of the succession of trays and means for passing a relatively colder fluid in heat exchange relation with the condenser elements.

2. A fractionating column including a succession of fractionating trays, each tray including a plurality of fractionating wells, the wells being provided with separate downcomers for conducting the liquid downwardly to individual wells in the next tray below and means for conducting the upwardly flowing vapor through the liquid in the wells, and a condensing and distributing means for liquefying vapor originating in the column and for distributing the liquefied vapor to individual wells of the first tray of the succession of fractionating trays, the condensing and distributing means including a plurality of condensing elements each having an inlet opening and a discharge opening, means conducting the vapor from the column to the inlet opening of each of the condenser elements, means conducting liquid from the discharge opening of each of the condenser elements to individual wells in the first tray of the succession of trays and means for passing a relatively colder fluid from the column in heat exchange relation with the condenser elements.

3. In a fractionating column, a gas-liquid contact section, a succession of fractionating trays in the gas-liquid contact section, each tray including a plurality of fractionating wells, the wells being provided with separate downcomers for conducting the liquid downwardly to individual wells in the next tray below and means for conducting the upwardly flowing vapor through the liquid in the wells, and a condensing and distributing means for liquefying vapor originating in the gas-liquid contact section and for distributing the liquefied vapor to individual wells of the first tray of the succession of fractionating trays, the condensing and distributing means including a plurality of vertically disposed condenser tubes each having an inlet opening and a discharge opening, means conducting the vapor from the contact section to the inlet opening of each of the condenser tubes, means conducting liquid from the discharge opening of each of the condenser tubes to individual wells in the first tray of the succession of trays and means for passing a relatively colder fluid from the column in heat exchange relation with the condenser tubes.

4. In a fractionating column, a gas-liquid contact section, a vertical succession of fractionating trays in the gas-liquid contact section, each tray including a plurality of fractionating wells, the wells being provided with separate downcomers for conducting the liquid downwardly to individual wells in the next tray below and means for conducting the upwardly flowing vapor through the liquid in the wells, and a condensing and distributing means for liquefying vapor originating in the gas-liquid contact section and for distributing the liquefied vapor to individual wells of the first tray of the succession of fractionating trays, the condensing and distributing means including a plurality of helical condenser tubes each having an inlet opening and a discharge opening, means conducting the vapor from the contact section to the inlet opening of each of the condenser tubes, means conducting liquid from the discharge opening of each of the condenser tubes to individual wells in the first tray of the succession of trays, and means for passing a relatively colder fluid from the column in heat exchange relation with the heilical condenser tubes, each helical condenser tube being disposed with its axis vertically positioned and with its discharge opening located below its inlet opening to direct liquefied vapor downwardly into an individual well.

5. In a fractionating column, a gas-liquid contact section, a vertical succession of fractionating trays in the gas-liquid contact section, each tray including a plurality of fractionating wells, the wells being provided with separate downcomers for conducting the liquid downwardly to individual wells in the next tray below and means for conducting the upwardly flowing vapor through the liquid in the wells, and a condensing and distributing means for liquefying vapor originating in the gas-liquid contact section and for distributing the liquefied vapor to individual wells of the first tray of the succession of fractionating trays, the condensing and distributing means including a plurality of condenser tubes each having an inlet opening and a discharge opening, means conducting the vapor from the contact section to the inlet opening of each of the condenser tubes, means conducting the liquid from the discharge openings of the condenser tubes to the individual wells in the first tray of the succession of trays, means for passing a relatively colder fluid from the column in heat exchange relation with the condenser tubes, and means for establishing substantially equal rates of flow through each of the condenser tubes.

6. In a fractionating column including a succession of fractionating trays with each tray including a plurality of fractionating wells and with the wells being provided with separate downcomers for conducting liquid downwardly to individual wells in the next tray below and means for conducting upwardly flowing vapor through the liquid in the wells, a condensing and distributing means for liquefying vapor originating in the colum and for distributing the liquefied vapor to individual wells of the first tray of the succession of fractionating trays comprising a plurality of condenser elements each having an inlet opening and a discharge opening, means conducting the vapor from the column to the inlet opening of each of the condenser elements, means conducting liquid from the discharge opening of each of the condenser elements to individual wells in the first tray of the succession of trays and means for passing a relatively colder fluid in heat exchange relation with the condenser elements.

7. In a fractionating column including a succession of fractionating trays with each tray including a plurality of fractionating wells and with the wells being provided with separate downcomers for conducting liquid downwardly to individual wells in the next tray below and means for conducting upwardly flowing vapor through the liquid in the wells, a condensing and distributing means for liquefying vapor originating in the column and for distributing the liquefied vapor to individual wells of the first tray of the succession of fractionating trays comprising a plurality of condenser elements each having an inlet opening and a discharge opening, means conducting the vapor from the column to the inlet opening of each of the condenser elements, means conducting liquid from the discharge opening of each of the condenser elements to individual wells in the first tray of the succession of trays and means for passing a relatively colder fluid from the column in heat exchange relation with the condenser elements.

8. A fractionating apparatus including two gas-liquid contact sections, a succession of fractionating trays in each of the sections, the trays in at least one of the sections including a plurality of fractionating wells, the wells being provided with separate downcomers for conducting the liquid downwardly to individual wells in the next tray below and means for conducting the upwardly flowing vapor through the liquid in the wells, a plurality of helical condenser elements each having an inlet opening and a discharge opening, means for conducting vapor from one of the contact sections through the inlet opening of each of the condenser elements, means for passing a relatively colder fluid in heat exchange relation with the condenser elements to liquefy the vapor in the condenser elements, means conducting the liquid from the discharge openings of the condenser elements to individual wells of the first tray in the succession of fractionating trays in the one section, means for collecting liquefied vapor from the discharge openings of other condenser elements and means for conducting the collected liquefied vapor as liquid reflux to the other contact section.

9. A fractionating apparatus including two gas-liquid contact sections, a succession of fractionating trays in each of the sections, the trays in at least one of the sections including a plurality of fractionating wells, the wells being provided with separate downcomers for conducting the liquid downwardly to individual wells in the next tray below and means for conducting the upwardly flowing vapor through the liquid in the wells, a plurality of condenser elements each having a inlet opening and a discharge opening, means for conducting vapor from one of the contact sections through the inlet opening of each of the condenser elements, means for passing a relatively colder fluid from the apparatus in heat exchange relation with the condenser elements to liquefy the vapor in the condenser elements, means conducting the liquid from the discharge openings of condenser elements to individual wells of the first tray in the succession of fractionating trays in the one section, means for collecting liquefied vapor from the discharge openings of other condenser elements and means for conducting the collected liquefied vapor as liquid reflux to the other contact section.

10. A fractionating apparatus including a high pressure gas-liquid contact section, a low pressure gas-liquid contact section, each of the sections including a succession of fractionating trays, the trays in at least the high pressure section including a plurality of fractionating wells, the wells being provided with separate downcomers for conducting the liquid downwardly to individual wells in the next tray below and means for conducting the upwardly flowing vapor through the liquid in the wells, a plurality of condenser elements each having an inlet opening and a discharge opening, means for conducting vapor from the high pressure section through the inlet opening of each of the condenser elements, means for passing a relatively colder fluid from the apparatus in heat exchange relation with the condenser elements to liquefy the vapor in the condenser elements, means conducting the liquid from the discharge openings of certain condenser elements to individual wells of the first tray in the succession of trays in the high pressure section, means for collecting liquid from the discharge openings of other condenser elements and means for conducting the collected liquid as liquid reflux for the low pressure section.

11. A fractionating apparatus as defined in claim 10 wherein the certain condenser elements are equal to the number of individual fractionating wells on the trays of the high pressure section and wherein the liquid discharged by the certain condenser elements provides the necessary reflux liquid for the high pressure section and the liquid discharged by the other condenser elements provides the necessary reflux liquid for the low pressure section.

12. A fractionating apparatus including two gas-liquid contact sections, a succession of fractionating trays in each of the sections, the trays in at least one of the sections including a plurality of fractionating wells, the wells being provided with separate downcomers for conducting the liquid downwardly to individual wells in the next tray below and means for conducting the upwardly flowing vapor through the liquid in the wells, a plurality of helical condenser tubes each having an inlet opening and a discharge opening, means for conducting vapor from one of the contact sections through the inlet opening of each of the condenser tubes, means for passing a relatively colder fluid in heat exchange relation with the condenser tubes to liquefy the vapor in the condenser tubes, means conducting the liquid from the discharge opening of condenser tubes to individual wells of the first tray in the succession of fractionating trays in the one section, means for collecting liquefied vapor from the discharge openings of other condenser tubes and means for conducting the collected liquefied vapor as liquid reflux to the other contact section.

13. A fractionating apparatus including a high pressure gas-liquid contact section, a low pressure gas-liquid contact section, each of the sections including a succession of fractionating trays, the trays in at least the high pressure section including a plurality of fractionating wells, the wells being provided with separate downcomers for conducting the liquid downwardly to individual wells in the next tray below and means for conducting the upwardly flowing vapor through the liquid in the wells, a plurality of helical condenser tubes each having an inlet opening and a discharge opening, means for conducting vapor from the high pressure section through the inlet opening of each of the condenser tubes, means for passing a relatively colder fluid from the apparatus in heat exchange relation with the condenser tubes, means conducting the liquid from the discharge opening of certain condenser tubes to individual wells of the first tray in the succession of trays in the high pressure section, means for collecting liquid from the discharge opening of other condenser tubes and means for conducting the collected liquid as liquid reflux for the low pressure section.

14. In an apparatus for fractionating air in two stages of rectification producing gaseous nitrogen fraction and crude liquid oxygen fraction in a high pressure stage and gaseous nitrogen product and liquid oxygen product in a low pressure stage, comprising a gas-liquid contact section for the high pressure stage, a gas-liquid contact section for the low pressure stage, a succession of fractionating trays in each of the sections, the trays in at least the section for the high pressure stage including a plurality of fractionating wells, the wells being provided with separate downcomers for conducting the liquid downwardly to individual wells in the next tray below and means for conducting the upwardly flowing vapor through the liquid in the wells, a plurality of condenser elements each having an inlet opening and a discharge opening, means for conducting gaseous nitrogen from the section for the high pressure stage through the inlet opening of each of the condenser elements, means for passing liquid oxygen product from the section for the low pressure stage in heat exchange relation with the condenser elements to liquefy the high pressure gaseous nitrogen in the condenser elements, means for conducting the liquefied gaseous nitrogen from the discharge openings of certain condenser elements to individual wells of the first tray of the succession of trays in the section for the high pressure stage, means for collecting liquefied gaseous nitrogen from the discharge openings of the other condenser elements, means for expanding a stream of the collected liquefied gaseous nitrogen and conducting the expanded stream as liquid reflux to the section for the low pressure stage.

15. In a fractionating apparatus as defined in claim 14 in which the number of the certain condenser elements corresponds to the number of fractionating wells on each of the fractionating trays in the section for the high pressure stage.

16. A fractionating apparatus comprising a cylindrical column including a plurality of liquid-vapor contact devices, an annular-shaped column including a plurality of liquid-vapor contact devices, means concentrically positioning the annular-shaped column around the cylindrical column, and the internal diameter of the annular column being substantially greater than the external diameter of the cylindrical column to provide an annular space between the cylindrical column and the annular column.

17. A fractionating apparatus as defined in claim 16 in which the cylindrical column extends beyond the ends of the annular-shaped column and means are provided for closing the space between the annular-shaped column and the cylindrical column at the ends of the annular-shaped column to form an annular chamber between the annular-shaped column and the cylindrical column.

18. A two-stage fractionating apparatus comprising a low pressure cylindrical column containing a plurality of liquid-vapor contact devices and an annular-shaped high pressure column containing a plurality of liquid-vapor contact devices, the annular column having an internal diameter greater than the external diameter of the cylindrical column, and means positioning the cylindrical column within the annular-shaped column.

19. A two-stage fractionating apparatus as defined in claim 18 in which the internal diameter of the annular column is substantially greater than the external diameter of the cylindrical column to form an annular space between the columns.

20. A fractionating apparatus comprising a hollow cylindrical casing closed at both ends forming a first fractionating zone, a succession of fractionating trays in the first zone, a hollow annular casing closed at both ends forming a second fractionating zone, a succession of fractionating trays in the second zone, and means positioning the cylindrical casing within the annular casing, the cylindrical casing having a length greater than the length of the annular casing and extending beyond the closed ends of the annular casing.

21. In a two-stage fractionating apparatus, a low pressure fractionating section comprising a hollow cylindrical column, a high pressure fractionating section comprising a hollow cylindrical structure provided with a cylindrical opening forming an annular-shaped column, the cylindrical opening having a diameter greater than the external diameter of the cylindrical column, and means supporting the cylindrical column within the cylindrical opening.

22. In a fractionating operation in which a mixture of compressed and cooled component gases introduced into a high pressure fractionating zone undergoes preliminary fractionation producing gaseous lower boiling fraction and liquid higher boiling fraction, lower boiling fraction being liquefied and fed into the high pressure fractionating zone as reflux and being liquefied and expanded and introduced into a lower pressure fractionating zone as reflux and higher boiling fraction being introduced into the lower pressure fractionating zone to gaseous lower boiling product and liquefied higher boiling product, a cylindrical casing closed at both ends and including a plurality of fractionating trays forming the lower pressure fractionating zone, a hollow annular casing closed at both ends and including a plurality of fractionating trays forming the high pressure fractionating zone, the internal diameter of the annular casing being greater than the external diameter of the cylindrical casing, means mounting the cylindrical casing within the annular casing, a plurality of condenser elements positioned around the cylindrical casing above the annular casing, conduit means withdrawing a stream of gaseous lower boiling fraction from the high pressure zone and conducting the gaseous lower boiling fraction to each of the condenser elements, means passing a relatively colder fluid in heat exchange relation with the condenser elements to liquefy the gaseous lower boiling fraction in the condenser elements, means conducting the liquefied lower boiling fraction from a portion of the condenser elements to the lower pressure fractionating zone as reflux and means conducting the liquefied lower boiling fraction from another portion of the condenser elements to the high pressure fractionating zone as reflux.

23. In a fractionating operation in which a mixture of compressed and cooled component gases introduced into a high pressure fractionating zone undergoes preliminary fractionation producing gaseous lower boiling fraction and liquid higher boiling fraction, lower boiling fraction being liquefied and fed into the high pressure fractionating zone as reflux and being liquefied and expanded and introduced into a lower pressure fractionating zone as reflux and higher boiling fraction being introduced into the lower pressure fractionating zone to complete the fractionation producing gaseous lower boiling product and liquefied higher boiling product, a cylindrical casing closed at both ends and including a plurality of fractionating trays froming the lower pressure fractionating zone, a hollow annular casing closed at both ends and including a plurality of fractionating trays forming the high pressure fractionating zone, the internal diameter of the annular casing being greater than the external diameter of the cylindrical casing, means mounting the cylindrical casing within the annular casing, a plurality of condenser elements positioned around the cylindrical casing above the annular casing, conduit means withdrawing a stream of gaseous lower boiling fraction from the high pressure zone and conducting the gaseous lower boiling fraction to each of the condenser elements, means passing a stream of liquid product from the lower pressure fractionating zone in heat exchange relation with the condenser elements to liquefy the gaseous lower boiling fraction in the condenser elements, means conducting liquefied lower boiling fraction from a portion of the condenser elements to the lower pressure fractionating zone as reflux and means conducting liquefied lower boiling fraction from another portion of the condenser elements to the high pressure fractionating zone as reflux.

24. In a fractionating operation in which a mixture of compressed and cooled component gases introduced into a high pressure fractionating zone undergoes preliminary fractionation producing gaseous lower boiling fraction and liquid higher boiling fraction, lower boiling fraction being liquefied and fed into the high pressure fractionating zone as reflux and being liquefied and expanded and introduced into a lower pressure fractionating zone as reflux and higher boiling fraction being introduced into the lower pressure fractionating zone to complete the fractionation producing gaseous lower boiling product and liquefied higher boiling product, a cylindrical casing closed at both ends and including a plurality of fractionating trays forming the lower pressure fractionating zone, a hollow annular casing closed at both ends and including a plurality of fractionating trays forming the high pressure fractionating zone, the internal diameter of the annular casing being greater than the external diameter of the cylindrical casing, means mounting the cylindrical casing within the annular casing, a second annular chamber mounted about the cylindrical casing above the annular casing, a plurality of condenser elements in the second chamber, conduit means withdrawing a stream of gaseous lower boiling fraction from the high pressure zone and conducting the gaseous lower boiling fraction to each of the condenser elements, means passing a relatively colder fluid in heat exchange relation with the condenser elements to liquefy gaseous lower boiling fraction in condenser elements, means conducting the liquefied lower boiling fraction from a portion of the condenser elements to the lower pressure fractionating zone as reflux and means conducting liquefied lower boiling fraction from another portion of the condenser elements to the high pressure fractionating zone as reflux.

25. In a fractionating operation in which a mixture of compressed and cooled component gases introduced into a high pressure fractionating zone undergoes preliminary fractionation producing gaseous lower boiling fraction and liquid higher boiling fraction, lower boiling fraction being liquefied and fed into the high pressure fractionating zone as reflux and being liquefied and expanded and introduced into a lower pressure fractionating zone as reflux and higher boiling fraction being introduced into the lower pressure fractionating zone to complete the fractionation producing gaseous lower boiling product and liquefied higher boiling product, a cylindrical casing closed at both ends and including a plurality of fractionating trays forming the lower pressure fractionating zone, a hollow annular casing closed at both ends and including a plurality of fractionating trays forming the high pressure fractionating zone, the internal diameter of the annular casing being greater than the external diameter of the cylindrical casing, means mounting the cylindrical casing within the annular casing, a second annular chamber mounted about the cylindrical casing above the annular casing, a plurality of condenser elements positioned in the second annular chamber around the cylindrical chamber above the annular casing, conduit means withdrawing a stream of gaseous lower boiling fraction from the high pressure zone and conducting the gaseous lower boiling fraction to each of the condenser elements, means passing a relatively colder fluid through the second annular chamber in heat exchange relation with the condenser elements to liquefy gaseous lower boiling fraction in condenser elements, means conducting the liquefied lower boiling fraction from a portion of the condenser elements to the lower pressure fractionating zone as reflux and means conducting liquefied lower boiling fraction from another portion of the condenser elements to the high pressure fractionating zone as reflux.

26. In a fractionating operation in which a mixture of compressed and cooled component gases introduced into a high pressure fractionating zone undergoes preliminary fractionation producing gaseous lower boiling fraction and liquid higher boiling fraction, lower boiling fraction being liquefied and fed into the high pressure fractionating zone as reflux and being liquefied and expanded and introduced into a lower pressure fractionating zone as reflux and higher boiling fraction being introduced into the lower pressure fractionating zone to complete the fractionation producing gaseous lower boiling product and liquefied higher boiling product, a cylindrical casing closed at both ends and including a plurality of fractionating trays forming the lower pressure fractionating zone, a hollow annular casing closed at both ends and including a plurality of fractionating trays forming the high pressure fractionating zone, the internal diameter of the annular casing being greater than the external diameter of the cylindrical casing, means mounting the cylindrical casing within the annular casing, a plurality of condenser elements positioned around the cylindrical casing above the annular casing, each of the condensers including an inlet conduit and a discharge conduit extending into the high pressure zone, conduit means withdrawing a stream of gaseous lower boiling fraction from the high pressure zone and conducting gaseous lower boiling fraction to each of the condenser elements, means passing a relatively colder fluid in heat exchange relation with the condenser elements to liquefy gaseous lower boiling fraction in the condenser elements, means conducting liquefied lower boiling fraction from a portion of the condenser elements to the lower pressure fractionating zone as reflux and means conducting liquefied lower boiling fraction from another portion of the condenser elements to the high pressure fractionating zone as reflux.

27. In a fractionating operation in which a mixture of compressed and cooled component gases introduced into a high pressure fractionating zone undergoes preliminary fractionation producing gaseous lower boiling fraction and liquid higher boiling fraction, lower boiling fraction being liquefied and fed into the high pressure fractionating zone as reflux and being liquefied and expanded and introduced into a lower pressure fractionating zone as reflux and higher boiling fraction being introduced into the lower pressure fractionating zone to complete the fractionation producing gaseous lower boiling product and liquefied higher boiling product, a cylindrical casing closed at both ends and including a plurality of fractionating trays forming the lower pressure fractionating zone, a hollow annular casing closed at both ends and including a plurality of fractionating trays forming the high pressure fractionating zone, the internal diameter of the annular casing being greater than the external diameter of the cylindrical casing, means mounting the cylindrical casing within the annular casing, a plurality of condenser elements positioned around the cylindrical casing above the annular casing, each of the condensers including an inlet conduit and a discharge conduit extending into the high pressure zone, conduit means withdrawing a stream of gaseous lower boiling fraction from the high pressure zone and conducting gaseous lower boiling fraction to each of the condenser elements, means passing a stream of liquid product from the lower pressure fractionating zone in heat exchange relation with the condenser elements to liquefy gaseous lower boiling fraction in the condenser elements, means conducting liquefied lower fraction from a portion of the condenser elements to the lower pressure fractionating zone as reflux and means conducting liquefied lower boiling fraction from another portion of the condenser elements to the high pressure fractionating zone as reflux.

28. In a fractionating operation in which a mixture of compressed and cooled component gases introduced into a high pressure fractionating zone undergoes preliminary fractionation producing gaseous lower boiling fraction and liquid higher boiling fraction, lower boiling fraction being liquefied and fed into the high pressure fractionating zone as reflux and being liquefied and expanded and introduced into a lower pressure fractionating zone as reflux and higher boiling fraction being introduced into the lower pressure fractionating zone to complete the fractionation producing gaseous lower boiling product and liquefied higher boiling product, a cylindrical casing closed at both ends and including a plurality of fractionating trays forming the lower pressure fractionating zone, a hollow annular casing closed at both ends and including a plurality of fractionating trays forming the high pressure fractionating zone, the internal diameter of the annular casing being greater than the external diameter of the cylindrical casing, means mounting the cylindrical casing within the annular casing, a second annular chamber mounted about the cylindrical casing above the annular casing, a plurality of condenser elements positioned in the second annular chamber around the cylindrical chamber above the annular casing, each of the condensers including an inlet conduit and a discharge conduit extending into the high pressure zone, conduit means withdrawing a stream of gaseous lower boiling fraction from the high pressure zone and conducting gaseous lower boiling fraction to each of the condenser elements, means passing a relatively colder fluid in heat exchange relation with the condenser elements to liquefy gaseous lower boiling fraction in the condenser elements, means conducting liquefied lower boiling fraction from a portion of the condenser elements to the lower pressure fractionating zone as reflux and means conducting liquefied lower boiling fraction from another portion of the condenser elements to the high pressure fractionating zone as reflux.

29. In a fractionating operation in which compressed and cooled air introduced into a high pressure fractionating zone undergoes preliminary fractionation producing gaseous nitrogen lower boiling fraction and liquid crude oxygen higher boiling fraction, gaseous nitrogen lower boiling fraction being liquefied and fed into the high pressure fractionating zone as reflux and being liquefied and expanded and introduced into a lower pressure fractionating zone as reflux and crude oxygen higher boiling fraction being introduced into the lower pressure fractionating zone to complete the fractionation producing gaseous nitrogen product and liquid oxygen product, a cylindrical casing closed at both ends and including a plurality of fractionating trays forming the lower pressure fractionating zone, a hollow annular casing closed at both ends and including a plurality of fractionating trays forming the high pressure fractionating zone, the internal diameter of the annular casing being greater than the external diameter of the cylindrical casing, means mounting the cylindrical casing within the annular casing, a plurality of condenser elements positioned around the cylindrical casing above the annular casing, conduit means withdrawing a stream of gaseous nitrogen lower boiling fraction from the high pressure zone and conducting gaseous nitrogen lower boiling fraction to each of the condenser elements, means passing a stream of liquid oxygen from the lower pressure fractionating zone in heat exchange relation with the condenser elements to liquefy gaseous nitrogen lower boiling fraction in the condenser elements, means conducting liquefied nitrogen lower boiling fraction from a portion of the condenser elements to the high pressure fractionating zone as reflux and means collecting liquefied nitrogen lower boiling fraction from another portion of the condenser elements and conducting collected liquefied nitrogen lower boiling fraction as reflux to the lower pressure fractionating zone.

30. In a fractionating operation in which compressed and cooled air introduced into a high pressure fractionating zone undergoes preliminary fractionation producing gaseous nitrogen lower boiling fraction and liquid crude oxygen higher boiling fraction, gaseous nitrogen lower boiling fraction being liquefied and fed into the high pressure fractionating zone as reflux and being liquefied and expanded and introduced into a lower pressure fractionating zone as reflux and crude oxygen higher boiling fraction being introduced into the lower pressure fractionating zone to complete the fractionation producing gaseous nitrogen product and liquid oxygen product, a cylindrical casing closed at both ends and including a plurality of fractionating trays forming the lower pressure fractionating zone, a hollow annular casing closed at both ends and including a plurality of fractionating trays forming the high pressure fractionating zone, the internal diameter of the annular casing being greater than the external diameter of the cylindrical casing, means mounting the cylindrical casing within the annular casing, a second annular chamber mounted about the cylindrical casing above the annular casing, a plurality of condenser elements in the second chamber, conduit means withdrawing a stream of gaseous nitrogen lower boiling fraction from the high pressure zone and conducting gaseous lower boiling fraction to each of the condenser elements, means passing a stream of liquid oxygen from the lower pressure fractionating zone to the second chamber in heat exchange relation with the condenser elements to liquefy gaseous nitrogen lower boiling fraction in the condenser elements, means conducting liquefied nitrogen lower boiling fraction from a portion of the condenser elements to the high pressure fractionating zone as reflux and means collecting liquefied nitrogen lower boiling fraction from another portion of the condenser elements and conducting collected liquefied nitrogen lower boiling fraction as reflux to the lower pressure fractionating zone.

31. In a fractionating operation in which compressed and cooled air introduced into a high pressure fractionatnig zone undergoes preliminary fractionation producing gaseous nitrogen lower boiling fraction and liquid crude oxygen higher boiling fraction, gaseous nitrogen lower boiling fraction being liquefied and fed into the high pressure fractionating zone as reflux and being liquefied and expanded and introduced into a lower pressure fractionating zone as reflux and crude oxygen higher boiling fraction being introduced into the lower pressure fractionating zone to complete the fractionation producing gaseous nitrogen product and liquid oxygen product, a cylindrical casing closed at both ends and including a plurality of fractionating trays forming the lower pressure fractionating zone, a hollow annular casing closed at both ends and including a plurality of fractionating trays forming the high pressure fractionating zone, the internal diameter of the annular casing being greater than the external diameter of the cylindrical casing, means mounting the cylindrical casing within the annular casing, a second annular chamber mounted about the cylindrical casing above the annular casing, a plurality of condenser elements positioned in the second annular chamber in a ring around the cylindrical chamber above the annular casing, conduit means withdrawing a stream of gaseous nitrogen lower boiling fraction from the high pressure zone and conducting gaseous nitrogen lower boiling fraction to each of the condenser elements, means passing a stream of liquid oxygen from the lower pressure fractionating zone through the second chamber in heat exchange relation with the condenser elements to liquefy gaseous nitrogen lower boiling fraction in the condenser elements, means conducting liquefied nitrogen lower boiling fraction from a portion of the condenser elements to the high pressure fractionating zone as reflux and means collecting liquefied nitrogen lower boiling fraction from another portion of the condenser elements and conducting collected liquefied nitrogen lower boiling fraction as reflux to the lower pressure fractionating zone.

32. In a fractionating operation in which compressed and cooled air introduced into a high pressure fractionating zone undergoes preliminary fractionation producing gaseous nitrogen lower boiling fraction and liquid crude oxygen higher boiling fraction, gaseous nitrogen lower boiling fraction being liquefied and fed into the pressure fractionating zone as reflux and being liquefied and expanded and introduced into a lower pressure fractionating zone as reflux and crude oxygen higher boiling fraction being introduced into the lower pressure fractionating zone to complete the fractionation producing gaseous nitrogen product and liquid oxygen product, a cylindrical casing closed at both ends and including a plurality of fractionating trays forming the lower pressure fractionating zone, a hollow annular casing closed at both ends and including a plurality of fractionating trays forming the high pressure fractionating zone, the internal diameter of the annular casing being greater than the external diameter of the cylindrical casing, means mounting the cylindrical casing within the annular casing, a plurality of condenser elements positioned around the cylindrical casing above the annular casing, each of the condensers including an inlet conduit and a discharge conduit extending into the high pressure zone, conduit means withdrawing a stream of gaseous nitrogen lower boiling fraction from the high pressure zone and conducting gaseous nitrogen lower boiling fraction to each of the condenser elements, means passing a stream of liquid oxygen from the lower pressure fractionating zone in heat exchange relation with the condenser elements to liquefy gaseous nitrogen lower boiling fraction in the condenser elements, means conducting liquefied nitrogen lower boiling fraction from a portion of the condenser elements to the high pressure fractionating zone as reflux and means collecting liquefied nitrogen lower boiling fraction from another portion of the condenser elements and conducting collected liquefied nitrogen lower boiling fraction as reflux to the lower pressure fractionating zone.

33. In a fractionating operation in which compressed and cooled air introduced into a high pressure fractionating zone undergoes preliminary fractionation producing gaseous nitrogen lower boiling fraction and liquid crude oxygen higher boiling fraction, gaseous nitrogen lower boiling fraction being liquefied and fed into the high pressure fractionating zone as reflux and being liquefied and expanded and introduced into a lower pressure fractionating zone as reflux and crude oxygen higher boiling fraction being introduced into the lower pressure fractionating zone to complete the fractionation producing gaseous nitrogen product and liquid oxygen product, a cylindrical casing closed at both ends and including a plurality of fractionating trays forming the lower pressure fractionating zone, a hollow annular casing closed at both ends and including a plurality of fractionating trays forming the high pressure fractionating zone, the internal diameter of the annular casing being greater than the external diameter of the cylindrical casing, means mounting the cylindrical casing within the annular casing, a second annular chamber mounted about the cylindrical casing above the annular casing, a plurality of condenser elements positioned in the second annular chamber in a ring around the cylindrical chamber above the annular casing, each of the condensers including an inlet conduit and a discharge conduit extending into the high pressure zone, conduit means withdrawing a stream of gaseous nitrogen lower boiling fraction from the high pressure zone and conducting gaseous nitrogen lower boiling fraction to each of the condenser elements, means passing a stream of liquid oxygen from the lower pressure fractionating zone through the second chamber in heat exchange relation with the condenser elements to liquefy gaseous nitrogen lower boiling fraction in the condenser elements, means conducting liquefied nitrogen lower boiling fraction from a portion of the condenser elements to the high pressure fractionating zone as reflux and means collecting liquefied nitrogen lower boiling fraction from another portion of the condenser elements and conducting collected liquefied nitrogen lower boiling fraction as reflux to the lower pressure fractionating zone.

34. In a fractionating operation in which a mixture of compressed and cooled component gases introduced into a high pressure fractionating zone undergoes preliminary fractionation producing gaseous lower boiling fraction and liquid higher boiling fraction, lower boiling fraction being liquefied and fed into the high pressure fractionating zone as reflux and being liquefied and expanded and introduced into a lower pressure fractionating zone as reflux and higher boiling fraction being introduced into the lower pressure fractionating zone to complete the fractionation producing gaseous lower boiling product and liquefied higher boiling product, a cylindrical casing closed at both ends and including a plurality of fractionating trays forming the lower pressure fractionating zone, a hollow annular casing closed at both ends and including a plurality of fractionating trays forming the high pressure fractionating zone, the internal diameter of the annular casing being greater than the external diameter of the cylindrical casing, the cylindrical casing being mounted in the annular casing with the ends of the cylindrical casing extending outwardly beyond the ends of the annular casing, the fractionating trays of at least the high pressure fractionating zone including a plurality of bubbling wells, the wells being provided with separate downcomers for conducting liquid downwardly to individual wells in the next tray below and means for conducting upwardly flowing vapor through the liquid in the wells, a plurality of condenser elements positioned around the cylindrical casing above the annular casing, each of the condenser elements having an inlet opening and a discharge conduit extending into the high pressure zone and terminating in individual wells of the first fractionating tray in the high pressure zone, means withdrawing a stream of gaseous lower boiling fraction from the high pressure zone and conducting the withdrawn stream to the inlet openings of the condenser elements, means passing a stream of liquefied higher boiling product from the lower pressure fractionating zone in heat exchange relation with the condenser elements to liquefy gaseous low boiling fraction whereby the discharge conduits of the condenser elements conduct liquefied gaseous low boiling fraction as reflux for the high pressure zone.

35. In a fractionating operation in which a mixture of compressed and cooled component gases introduced into a high pressure fractionating zone undergoes preliminary fractionation producing gaseous lower boiling fraction and liquid higher boiling fraction, lower boiling fraction being liquefied and fed into the high pressure fractionating zone as reflux and being liquefied and expanded and introduced into a lower pressure fractionating zone as reflux and higher boiling fraction being introduced into the lower pressure fractionating zone to produce gaseous lower boiling product and liquefied higher boiling product, a cylindrical casing closed at both ends and including a plurality of fractionating trays forming the lower pressure fractionating zone, a hollow annular casing closed at both ends and including a plurality of fractionating trays forming the high pressure fractionating zone, the internal diameter of the annular casing being greater than the external diameter of the cylindrical casing, the cylindrical casing being mounted in the annular casing with the ends of the cylindrical casing extending outwardly beyond the ends of the annular casing, the fractionating trays of at least the high pressure fractionating zone including a plurality of bubbling wells, the wells being provided with separate downcomers for conducting liquid downwardly to individual wells in the next tray below and means for conducting upwardly flowing vapor through the liquid in the wells, a second annular casing forming an annular chamber positioned around the cylindrical casing above the hollow annular casing, a plurality of condenser elements vertically disposed in the annular chamber about the cylindrical casing, each of the condenser elements having an inlet opening and a discharge conduit extending into the high pressure zone and terminating in individual wells of the first fractionating tray in the high pressure zone, means withdrawing a stream of gaseous lower boiling fraction from the high pressure zone and conducting gaseous lower boiling fraction to the inlet openings of the condenser elements, means passing a stream of liquefied higher boiling product from the lower pressure fractionating zone in heat exchange relation with the condenser elements to liquefy gaseous low boiling fraction whereby the discharge conduits of the condenser elements conduct liquefied gaseous low boiling fraction as reflux for the high pressure zone.

36. In a fractionating operation in which compressed and cooled air introduced into a high pressure fractionating zone undergoes preliminary fractionation producing gaseous nitgrogen lower boiling fraction and liquid crude oxygen higher boiling fraction, gaseous nitrogen lower boiling fraction being liquefied and fed into the high pressure fractionating zone as reflux and being liquefied and expanded and introduced into a lower pressure fractionating zone as reflux and crude oxygen higher boiling fraction being introduced into the lower pressure fractionating zone to complete the fractionation producing gaseous nitrogen product and liquid oxygen product, a cylindrical casing closed at both ends and including a plurality of fractionating trays forming the lower pressure fractionating zone, a hollow annular casing closed at both ends and including a plurality of fractionating trays forming the high pressure fractionating zone, the internal diameter of the annular casing being greater than the external diameter of the cylindrical casing, the cylindrical casing being mounted in the annular casing with the ends of the cylindrical casing extending outwardly beyond the ends of the annular casing, the fractionating trays of at least the high pressure fractionating zone including a plurality of bubbling wells, the wells being provided with separate downcomers for conducting liquid downwardly to individual wells in the next tray below and means for conducting upwardly flowing vapor through the liquid in the wells, a plurality of condenser elements positioned around the cylindrical casing above the annular casing, each of the condenser elements having an inlet opening and a discharge conduit extending into the high pressure zone and terminating in individual wells of the first fractionating tray in the high pressure zone, means withdrawing a stream of gaseous nitrogen lower boiling fraction from the high pressure zone and conducting gaseous nitrogen lower boiling fraction to the inlet openings of the condenser elements, means passing a stream of liquefied oxygen product from the lower pressure fractionating zone in heat exchange relation with the condenser elements to liquefy gaseous nitrogen low boiling fraction whereby the discharge conduits of the condenser elements conduct liquefied gaseous introgen low boiling fraction as reflux for the high pressure section.

37. In the fractionating operation in which compressed and cooled air introduced into a high pressure fractionating zone undergoes preliminary fractionation producing gaseous nitrogen lower boiling fraction and liquid crude oxygen higher boiling fraction, gaseous nitrogen lower boiling fraction being liquefied and fed into the high pressure fractionating zone as reflux and being liquefied and expanded and introduced into a lower pressure fractionating zone as reflux and crude oxygen high boiling fraction being introduced into the lower pressure fractionating zone to complete the fractionation producing gaseous nitrogen product and liquid oxygen product, a cylindrical casing closed at both ends and including a plurality of fractionating trays forming the lower pressure fractionating zone, a hollow annular casing closed at both ends and including a plurality of fractionating trays forming the high pressure fractionating zone, the internal diameter of the annular casing being greater than the external diameter of the cylindrical casing, the cylindrical casing being mounted in the annular casing with the ends of the cylindrical casing extending outwardly beyond the ends of the annular casing, the fractionating trays of at least the high pressure fractionating zone including a plurality of bubbling wells, the wells being provided with separate downcomers for conducting liquid downwardly to individual wells in the next tray below and means for conducting upwardly flowing vapor through the liquid in the wells, a second annular casing forming an annular chamber positioned around the cylindrical casing above the hollow annular casing, a plurality of condenser elements vertically disposed in the annular chamber about the cylindrical casing, each of the condenser elements having an inlet opening and a discharge conduit extending into the high pressure zone and terminating in an individual well of the first fractionating tray in the high pressure zone, means withdrawing a stream of gaseous nitrogen lower boiling fraction from the high pressure zone and conducting gaseous nitrogen lower boiling fraction to the inlet openings of the condenser elements, means passing a stream of liquefied oxygen product from the lower pressure fractionating zone in heat exchange relation with the condenser elements to liquefy gaseous nitrogen low boiling fraction whereby the discharge conduits of the condenser elements conduct liquefied gaseous nitrogen low boiling fraction as reflux for the high pressure section.

38. In a fractionating operation in which a mixture of compressed and cooled component gases introduced into a high pressure fractionating zone undergoes preliminary fractionation producing gaseous lower boiling fraction and liquid higher boiling fraction, lower boiling fraction being liquefied and fed into the high pressure fractionating zone as reflux and being liquefied and expanded and introduced into a lower pressure fractionating zone as reflux and higher boiling fraction being introduced into the lower pressure fractionating zone to complete the fractionation producing gaseous lower boiling product and liquefied higher boiling product, a cylindrical casing closed at both ends and including a plurality of fractionating trays forming the lower pressure fractionating zone, a hollow annular casing closed at both ends and including a plurality of fractionating trays forming the high pressure fractionating zone, the internal diameter of the annular casing being greater than the external diameter of the cylindrical casing, the cylindrical casing being mounted in the annular casing with the ends of the cylindrical casing extending outwardly beyond the ends of the annular casing, the fractionating trays of at least the high pressure fractionating zone including a plurality of bubbling wells, the wells being provided with separate downcomers for conducting liquid downwardly to individual wells in the next tray below and means for conducting upwardly flowing vapor through the liquid in the wells, a plurality of condenser elements positioned around the cylindrical casing above the annular casing, each of the condenser elements having an inlet opening and a discharge opening, means for withdrawing a stream of gaseous lower boiling fraction from the high pressure zone and conducting gaseous lower boiling fraction to the inlet opening of the condenser elements, means passing a stream of liquefied higher boiling product from the lower pressure fractionating zone in heat exchange relation with the condenser elements to liquefy gaseous lower boiling fraction in the condenser elements, means conducting liquefied lower boiling fraction from certain condenser elements to individual wells in the first fractionating tray in the high pressure section, means collecting liquefied lower boiling fraction from other condenser elements, means expanding a stream of collected liquefied lower boiling fraction and introducing expanded lower boiling fraction as reflux into the lower pressure column.

39. In a fractionating operation of the character set forth in claim 38 in which the certain condenser elements are equal to the number of individual fractionating coils on the first fractionating tray of the high pressure section.

40. In a fractionating operation of the character set forth in claim 39 in which the condenser elements comprise tubular members formed into helical coils vertically disposed and positioned around the cylindrical casing.

41. In a fractionating operation in which compressed and cooled air introduced into a high pressure fractionating zone undergoes preliminary fractionation producing gaseous nitrogen lower boiling fraction and liquid crude oxygen higher boiling fraction, gaseous nitrogen lower boiling fraction being liquefied and fed into the high pressure fractionating zone as reflux and being liquefied and expanded and introduced into a lower pressure fractionating zone as reflux and crude oxygen higher boiling fraction being introduced into the lower pressure fractionating zone to complete the fractionation producing gaseous nitrogen product and liquid oxygen product, a cylindrical casing closed at both ends and including a plurality of fractionating trays forming the lower pressure fractionating zone, a hollow annular casing closed at both ends and including a plurality of fractionating trays forming the high pressure fractionating zone, the internal diameter of the annular casing being greater than the external diameter of the cylindrical casing, the cylindrical casing being mounted in the annular casing with the ends of the cylindrical casing extending outwardly beyond the ends of the annular casing, the fractionating trays of at least the high pressure fractionating zone including a plurality of bubbling wells, the wells being provided with separate downcomers for conducting liquid downwardly to individual wells in the next tray below and means for conducting upwardly flowing vapor through the liquid in the wells, a plurality of condenser elements positioned around the cylindrical casing above the annular casing, each of the condenser elements having an inlet opening and a discharge opening, means withdrawing a stream of gaseous nitrogen lower boiling fraction from the high pressure zone and conducting gaseous nitrogen lower boiling fraction to the inlet openings of the condenser elements, means passing a stream of liquefied oxygen product from the lower pressure fractionating zone in heat exchange relation with the condenser elements to liquefy gaseous nitrogen lower boiling fraction in the condenser elements, means conducting liquefied nitrogen lower boiling fraction from certain condenser elements to individual wells in the first fractionating tray in the high pressure section, means collecting liquefied nitrogen lower boiling fraction from other condenser elements, means expanding a stream of collected liquefied nitrogen lower boiling fraction and introducing the expanded stream as reflux into the lower pressure column.

42. In a fractionating operating of the character set forth in claim 41 in which the certain condenser elements are equal to the number of individual fractionating wells on the first fractionating tray of the high pressure section.

43. In a fractionating operation of the character set forth in claim 42 in which the condenser elements comprise tubular members formed into helical coils vertically disposed and positioned around the cylindrical casing.

References Cited in the file of this patent

UNITED STATES PATENTS

| | | |
|---|---|---|
| 1,510,178 | Lachmann | Sept. 30, 1924 |
| 1,800,363 | Messer | Apr. 14, 1931 |
| 1,976,800 | Nesselmann | Oct. 16, 1934 |
| 2,070,100 | Twomey | Feb. 9, 1937 |
| 2,208,573 | Fenske | July 25, 1940 |
| 2,292,350 | Brandt | Aug. 11, 1942 |

FOREIGN PATENTS

| | | |
|---|---|---|
| 372,067 | Great Britain | May 5, 1932 |